(12) United States Patent
Kinoshita

(10) Patent No.: US 10,958,848 B2
(45) Date of Patent: Mar. 23, 2021

(54) ELECTRONIC APPARATUS

(71) Applicant: NIKON CORPORATION, Tokyo (JP)

(72) Inventor: Akira Kinoshita, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/025,303

(22) PCT Filed: Sep. 30, 2014

(86) PCT No.: PCT/JP2014/076065
§ 371 (c)(1),
(2) Date: Jun. 27, 2016

(87) PCT Pub. No.: WO2015/050118
PCT Pub. Date: Apr. 9, 2015

(65) Prior Publication Data
US 2016/0316132 A1 Oct. 27, 2016

(30) Foreign Application Priority Data
Oct. 1, 2013 (JP) .............................. JP2013-206434

(51) Int. Cl.
H04N 5/235 (2006.01)
H04N 5/345 (2011.01)
H04N 5/232 (2006.01)
H04N 5/353 (2011.01)
G02B 27/10 (2006.01)
H04N 5/225 (2006.01)
G03B 13/36 (2021.01)

(52) U.S. Cl.
CPC ....... H04N 5/2353 (2013.01); G02B 27/1013 (2013.01); H04N 5/2256 (2013.01); H04N 5/23209 (2013.01); H04N 5/23212 (2013.01); H04N 5/345 (2013.01); H04N 5/3535 (2013.01); G03B 13/36 (2013.01)

(58) Field of Classification Search
None
See application file for complete search history.

(56) References Cited

U.S. PATENT DOCUMENTS 8,599,284 B2 * 12/2013 Mo ..................... H04N 5/355 348/218.1
9,204,056 B2 * 12/2015 Kaizu ................. H04N 5/2353
9,420,193 B2 * 8/2016 Kaizu ................. H04N 5/374
(Continued)

FOREIGN PATENT DOCUMENTS

JP H07-154676 A 6/1995
JP 2007-271809 A 10/2007
(Continued)

OTHER PUBLICATIONS

Dec. 22, 2014 Search Report issued in International Patent Application No. PCT/JP2014/076065.
(Continued)

Primary Examiner — Quan Pham
(74) Attorney, Agent, or Firm — Oliff PLC

(57) ABSTRACT

A digital camera includes an image sensor that can receive a light beam from a subject in a first region (one block) and a second region (another block) and capture images in the first region and second region on different conditions and a control unit that controls image capture by applying multiple image capture conditions to a first process at least in the first region.

15 Claims, 19 Drawing Sheets

(56) References Cited

U.S. PATENT DOCUMENTS

| | | | |
|---|---|---|---|
| 2004/0252211 A1* | 12/2004 | Rhodes | H04N 5/3698 348/308 |
| 2006/0023109 A1 | 2/2006 | Mabuchi et al. | |
| 2006/0103745 A1 | 5/2006 | Nagaishi et al. | |
| 2007/0195182 A1 | 8/2007 | Ito | |
| 2007/0253695 A1 | 11/2007 | Miyazawa et al. | |
| 2010/0002940 A1 | 1/2010 | Aoki et al. | |
| 2010/0231738 A1 | 9/2010 | Border et al. | |
| 2011/0038563 A1* | 2/2011 | Bremer | G06K 7/10722 382/313 |
| 2011/0149129 A1 | 6/2011 | Kim et al. | |
| 2011/0205403 A1* | 8/2011 | Ito | G02B 7/36 348/241 |
| 2011/0228053 A1* | 9/2011 | Aoki | H04N 5/23212 348/49 |
| 2013/0088624 A1* | 4/2013 | Mo | H04N 5/355 348/300 |
| 2013/0214125 A1* | 8/2013 | Solhusvik | H04N 5/2351 250/208.1 |
| 2014/0063300 A1* | 3/2014 | Lin | H04N 9/045 348/277 |
| 2014/0333812 A1* | 11/2014 | Kuroda | H04N 5/3745 348/302 |
| 2015/0070544 A1* | 3/2015 | Smith | H01L 27/14627 348/297 |
| 2015/0092098 A1* | 4/2015 | Konishi | H04N 5/2352 348/333.11 |

FOREIGN PATENT DOCUMENTS

| | | |
|---|---|---|
| JP | 2012-134651 A | 7/2012 |
| JP | 2013-192058 A | 9/2013 |

OTHER PUBLICATIONS

Apr. 5, 2016 International Preliminary Report on Patentability issued in International Patent Application No. PCT/JP2014/076065.

Oct. 12, 2017 Supplementary European Search Report issued in European Patent Application No. 14850427.7.

Mar. 26, 2019 Office Action issued in Japanese Patent Application No. 2015-540502.

Mar. 26, 2019 Decision of Dismissal of Amendment issued in Japanese Patent Application No. 2015-540502.

Mar. 6, 2019 Office Action issued in Chinese Patent Application No. 201480060312.X.

Mar. 10, 2020 Office Action issued in Japanese Patent Application No. 2019-118706.

Mar. 9, 2020 Office Action issued in Chinese Patent Application No. 201480060312.X.

Jul. 17, 2020 Office Action issued in European Patent Application No. 14 850 427.7.

Jul. 21, 2020 Office Action issued in Chinese Patent Application No. 201910663234.7.

Nov. 16, 2020 Office Action issued in Indian Patent Application No. 201617014705.

\* cited by examiner

ELECTRONIC APPARATUS

TECHNICAL FIELD

The present invention relates to an electronic apparatus.

BACKGROUND ART

Electronic apparatuses each including an image sensor in which a back-illuminated image capture chip and a signal processing chip are stacked (hereafter referred to as a stacked image sensor) have been proposed (for example, see Patent Literature 1). In a stacked image sensor, a back-illuminated image capture chip and a signal processing chip are stacked so as to be connected via micro-bumps corresponding to blocks each including multiple pixels.

CITATION LIST

Patent Literature

[Patent Literature 1] Japanese Unexamined Patent Application Publication No. 2006-49361

SUMMARY OF INVENTION

Technical Problem

However, there have been proposed only a few electronic apparatuses including a stacked image sensor that captures images on a multiple-block basis. Accordingly, the usability of electronic apparatuses including a stacked image sensor has not been sufficiently improved.

An object of an aspect of the present invention is to accurately perform metering and light source determination by capturing images in a single region on multiple image capture conditions.

Solution to Problem

A first aspect of the present invention provides an electronic apparatus including an image sensor that captures images in a first light-receiving region and a second light-receiving region on different image capture conditions and a control unit that controls image capture on image capture conditions obtained from an image captured in the first light-receiving region and an image captured in the second light-receiving region.

A second aspect of the present invention provides an electronic apparatus including an image sensor that can receive a light beam from a subject in a first region and a second region and capture images in the first region and second region on different conditions and a control unit that controls image capture by applying multiple image capture conditions to a first process at least in the first region.

Advantageous Effects of the Invention

According to the aspect of the present invention, it is possible to capture images favorably by capturing images in a single region on multiple image capture conditions.

DESCRIPTION OF EMBODIMENTS

Figure 1:
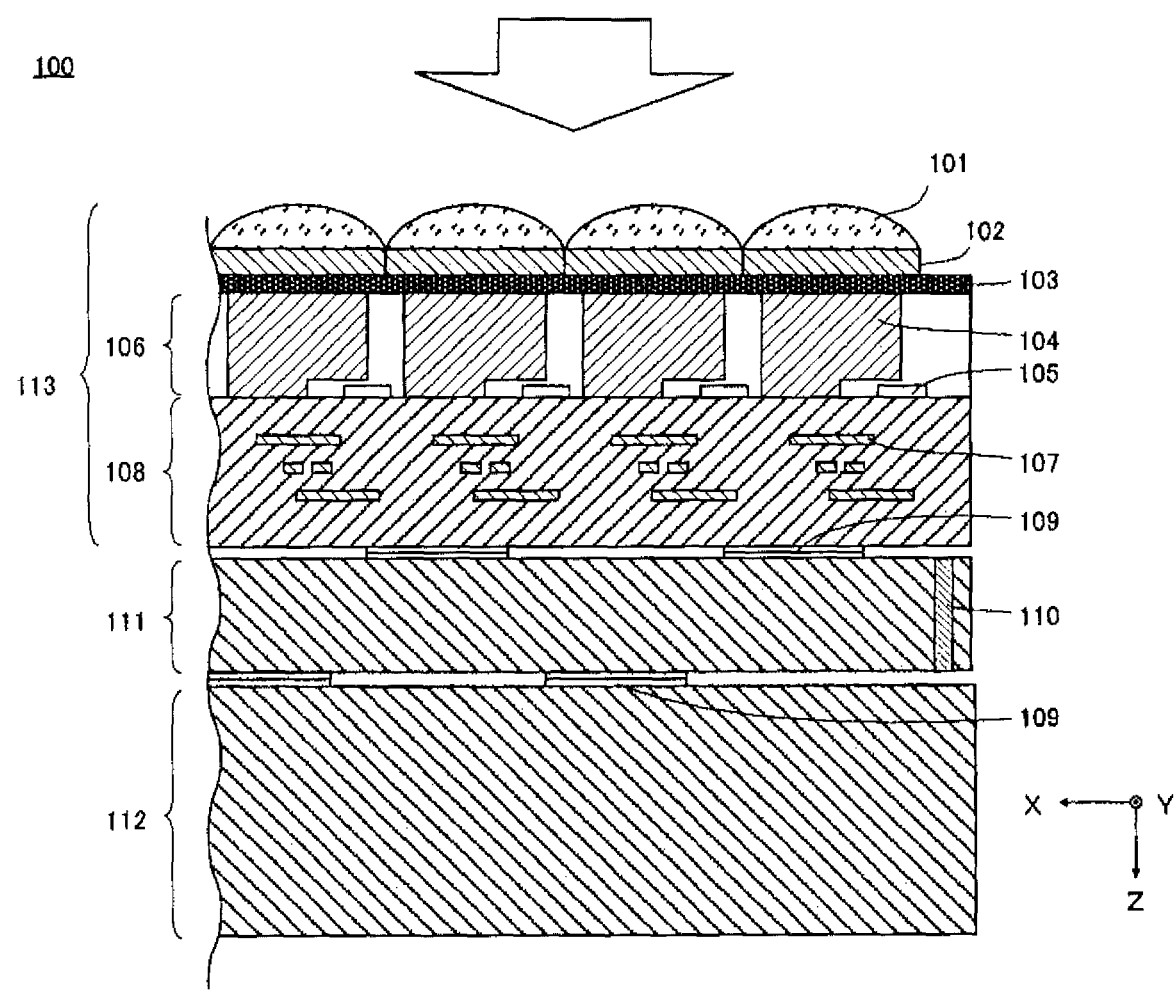
FIG. 1 is a sectional view of an image sensor of a first embodiment.

FIG. 1 is a sectional view of an image sensor 100 of a first embodiment. The image sensor 100 is disclosed in Japanese Patent Application No. 2012-139026 previously filed by the present applicant. The image sensor 100 includes an image capture chip 113 that outputs a pixel signal corresponding to incident light, a signal processing chip 111 that processes the pixel signal outputted from the image capture chip 113, and a memory chip 112 that stores the pixel signal processed by the signal processing chip 111. The image capture chip 113, signal processing chip 111, and memory chip 112 are stacked. The image capture chip 113 and signal processing chip 111 are electrically connected via conductive bumps 109 formed of Cu or the like. The signal processing chip 111 and memory chip 111 are also electrically connected via conductive bumps 109 formed of as Cu or the like.

As indicated by a coordinate axis shown in FIG. 1, incident light enters the image sensor 100 mostly in a positive z-axis direction. In the present embodiment, the incident light entry surface of the image capture chip 113 is referred to as the back surface. Further, as indicated by another coordinate axis, the direction which is perpendicular to the z-axis and oriented to the left side of the drawing is referred to as a positive x-axis direction, and the direction which is perpendicular to the z- and x-axes and oriented to the viewer is referred to as a positive y-axis direction. In the following some drawings, coordinate axes are shown using the coordinate axes of FIG. 1 as references so that the orientations of such drawings are understood.

One example of the image-capture chip 113 is a back-illuminated MOS image sensor. A PD layer 106 is disposed on the back surface of a wiring layer 108. The PD layer 106 includes multiple photodiodes (PDs) 104 disposed two-dimensionally and configured to accumulate charge corresponding to incident light and transistors 105 disposed in a manner corresponding to the PDs 104.

Color filters 102 are disposed over the incident light entry surface of the PD layer 106 with a passivation film 103 therebetween. The color filters 102 are each a filter which transmits a particular wavelength range of visible light. That is, the color filters 102 include multiple color filters which transmit different wavelength ranges and are arranged in a particular manner so as to correspond to the PDs 104. The arrangement of the color filters 102 will be described later. A set of a color filter 102, a PD 104, and a transistor 105 forms one pixel.

Microlenses 101 are disposed on the incident light entry sides of the color filters 102 in a manner corresponding to the pixels. The microlenses 101 condense incident light toward the corresponding PDs 104.

The wiring layer 108 includes lines 107 configured to transmit pixel signals from the PD layer 106 to the signal processing chip 111. The lines 107 may be multilayered and may include passive and active elements. Multiple bumps 109 are disposed on the front surface of the wiring layer 108 and aligned with multiple bumps 109 disposed on the opposite surface of the signal processing chip 111. The aligned bumps 109 are bonded together and electrically connected together, for example, by pressurizing the image-capture chip 113 and signal processing chip 111.

Similarly, multiple bumps 109 are disposed on the opposite surfaces of the signal processing chip 111 and memory chip 112 and aligned with each other. The aligned bumps 109 are bonded together and electrically connected together, for example, by pressurizing the signal processing chip 111 and memory chip 112.

The methods for bonding the bumps 109 together include Cu bump bonding using solid phase diffusion, as well as micro-bump bonding using solder melting. For the bumps 109, it is only necessary to provide, for example, one bump or so with respect to one unit group (to be discussed later). Accordingly, the size of the bumps 109 may be larger than the pitch between the PDs 104. Further, bumps which are larger than the bumps 109 corresponding to a pixel region having the pixels arranged therein (a pixel region 113A shown in FIG. 2) may be additionally provided in peripheral regions other than the pixel region.

The signal processing chip 111 includes a through-silicon via (TSV) 110 configured to connect together circuits disposed on the front and back surfaces thereof. The TSV 110 is disposed in a peripheral region. Alternatively, the TSV 110 may be disposed in a peripheral region of the image-capture chip 113 or in the memory chip 112.

Figure 2:
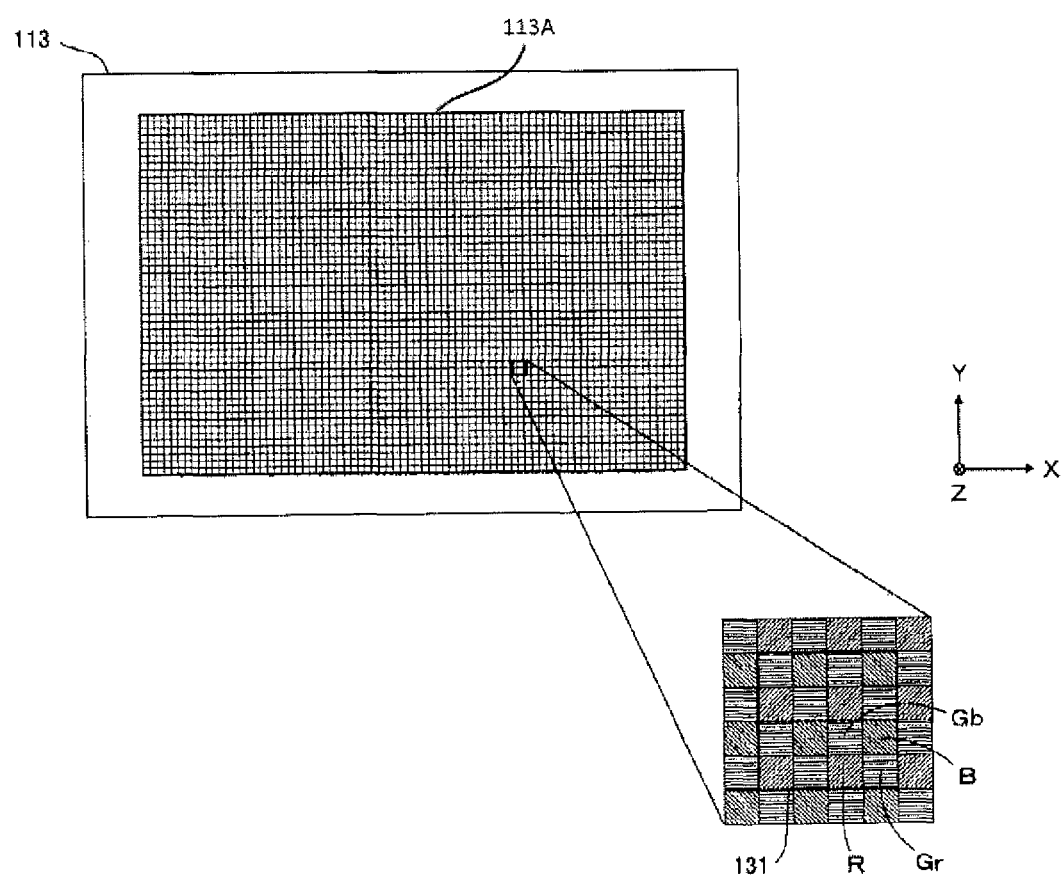
FIG. 2 is a diagram showing the pixel array of an image capture chip and a unit group.

FIG. 2 is a diagram showing the pixel array of the image-capture chip and a unit group. In FIG. 2, the image-capture chip 113 is observed from the back side. The pixel region 113A is the pixel-arranged region of the image-capture chip 113. In the pixel region 113A, 20 million or more pixels are arranged in a matrix. In an example shown in FIG. 2, four adjacent pixels×four adjacent pixels, that is, 16 pixels form one unit group 131. Grid lines in FIG. 2 show a concept that adjacent pixels are grouped into unit groups 131. The number of pixels forming the unit groups 131 is not limited to that described above and may be on the order of 1000, for example, 32 pixels×64 pixels, or may be 1000 or more or less than 1000.

As shown in a partial enlarged view of the pixel region 113A, one unit group 131 includes four so-called Bayer arrays which each includes four pixels, that is, green pixels Gb, Gr, a blue pixel B, and a red pixel R and which are arranged vertically and horizontally. The green pixels are each a pixel having a green filter as a color filter 102 and receive light in the green wavelength band of incident light. Similarly, the blue pixel is a pixel having a blue filter as a color filter 102 and receives light in the blue wavelength band. The red pixel is a pixel having a red filter as a color filter 102 and receives light in the red wavelength band.

Figure 3:
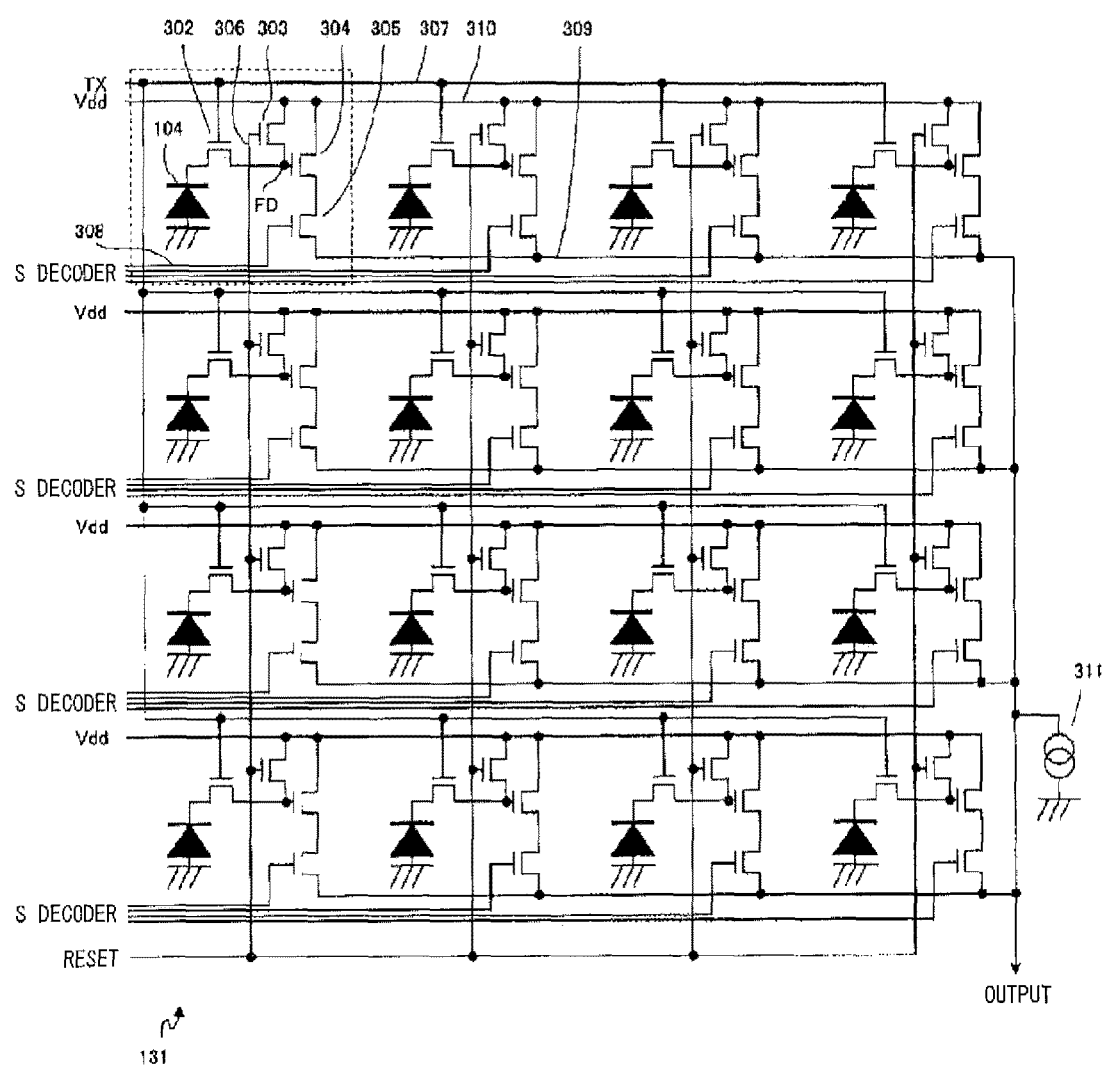
FIG. 3 is a circuit diagram of a unit group of the image capture chip.

FIG. 3 is a circuit diagram of a unit group of the image-capture chip. In FIG. 3, a rectangle surrounded by a dotted line as a representative shows the circuit of one pixel. At least part of each transistor described below corresponds to one transistor 105 in FIG. 1.

As described above, one unit group 131 includes 16 pixels. Sixteen PDs 104 included in these pixels are connected to corresponding transfer transistors 302. The gates of the transfer transistors 302 are connected to a TX line 307 through which a transfer pulse is supplied. In the present embodiment, the TX line 307 is shared by the 16 transfer transistors 302.

The drain of each transfer transistor 302 is connected to the source of a corresponding reset transistor 303, and so-called floating diffusion FD (charge detection unit) therebetween is connected to the gate of a corresponding amplifier transistor 304. The drains of the reset transistors 303 are connected to a Vdd line 310 through which a power-supply voltage is supplied. The gates of the reset transistors 303 are connected to a reset line 306 through which a reset pulse is supplied. In the present embodiment, the reset line 306 is shared by the 16 reset transistors 303.

The drains of the amplifier transistors 304 are connected to the Vdd line 310, through which a power-supply voltage is supplied. The sources of the amplifier transistors 304 are connected to the drains of corresponding select transistors 305.

The gates of the select transistors 305 are connected to corresponding decoder lines 308 through which a selection pulse is supplied. In the present embodiment, the different decoder lines 308 are disposed with respect to the 16 select transistors 305. The sources of the select transistors 305 are connected to a shared output line 309. A load current source 311 supplies a current to the output line 309. That is, the output line 309 with respect to the select transistors 305 is formed by a source follower. The load current source 311 may be disposed in any of the image-capture chip 113 and signal processing chip 111.

Described below is the flow from when the accumulation of charge starts to when pixel signals are outputted after the accumulation ends. Reset pulses are applied to the reset transistors 303 through the reset line 306. Simultaneously, transfer pulses are applied to the transfer transistors 302 through the TX line 307. Thus, the potentials of the PDs 104 and floating diffusion FD are reset.

When the application of the transfer pulses is released, the PDs 104 convert received incident light into charge and accumulate it. Subsequently, when transfer pulses are applied again with reset pulses not being applied, the charge accumulated in each PD 104 is transferred to the corresponding floating diffusion FD. Thus, the potential of the floating diffusion FD is changed from the reset potential to the signal potential after the charge accumulation. When selection pulses are applied to the select transistors 305 through the decoder lines 308, the variation in the signal potential of each floating diffusion FD is transmitted to the output line 309 through the corresponding amplifier transistor 304 and select transistor 305. Based on such a circuit operation, the unit pixels output, to the output line 309, pixel signals corresponding to the reset potentials and pixel signals corresponding to the signal potentials.

As shown in FIG. 3, in the present embodiment, the reset line 306 and TX line 307 are shared by the 16 pixels forming the unit group 131. That is, reset pulses and transfer pulses are simultaneously applied to all the 16 pixels. Accordingly, all the pixels forming the unit group 131 start to accumulate charge at the same timing and end the charge accumulation at the same timing. Note that selection pulses are sequentially applied to the select transistors 305 and therefore pixel signals corresponding to the accumulated charge are selectively outputted to the output line 309. Different reset lines 306, TX lines 307, and output lines 309 are disposed for the respective unit groups 131.

By constructing the circuit on the basis of unit groups 131 as described above, the charge accumulation time can be controlled for each unit group 131. In other words, it is possible to cause the unit groups 131 to output pixel signals based on different charge accumulation times. More specifically, by causing another unit group 131 to accumulate charge several times and to output pixel signals each time while one unit group 131 is caused to accumulate charge once, it is possible to cause the unit groups 131 to output moving image frames at different frame rates.

Figure 4:
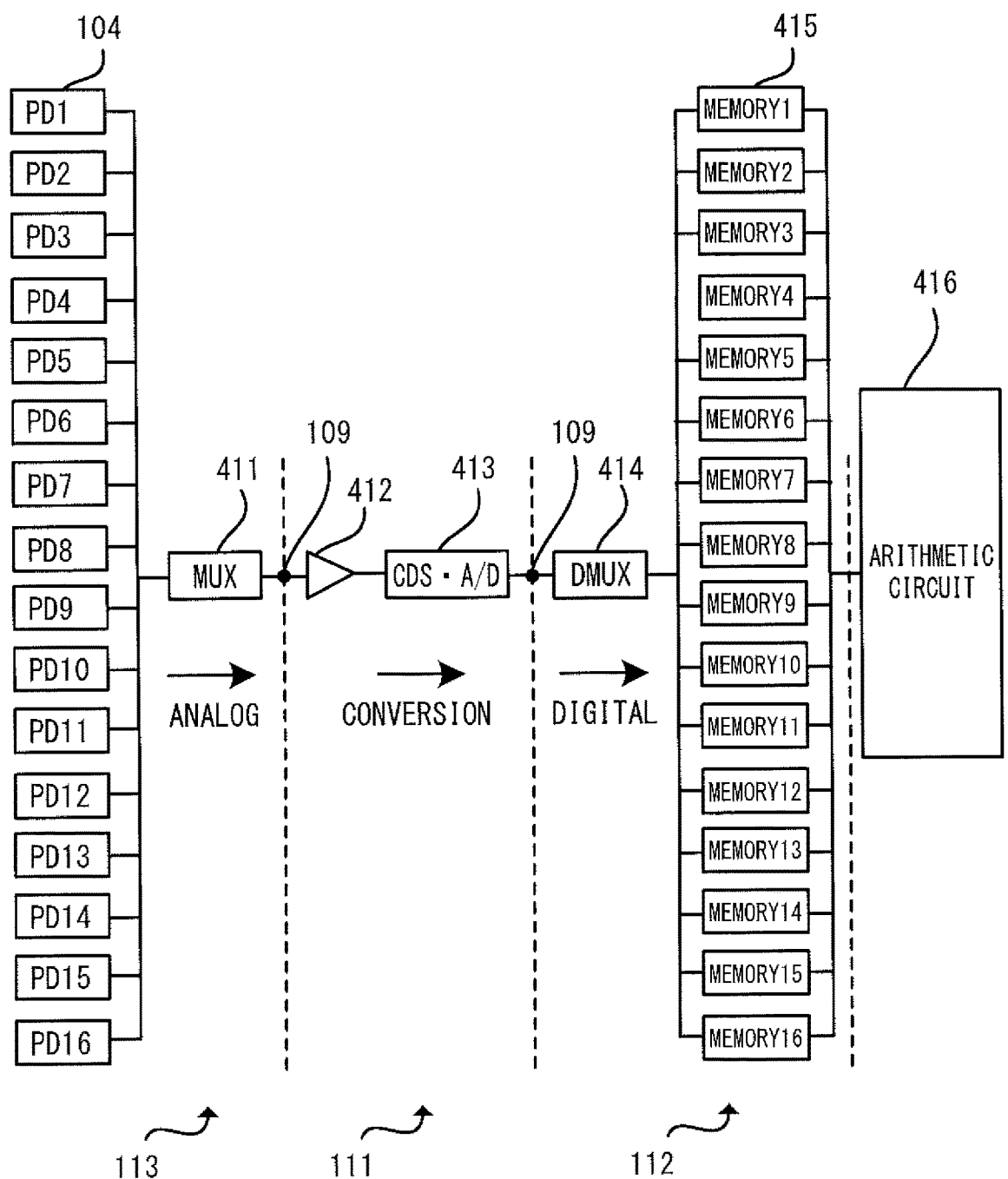
FIG. 4 is a block diagram showing the functional configuration of the image sensor.

FIG. 4 is a block diagram showing the functional configuration of the image sensor. An analog multiplexer 411 sequentially selects 16 PDs 104 forming one unit group 131 and causes each selected PD 104 to output a pixel signal to an output line 309 disposed in a manner corresponding to the unit group 131. The multiplexer 411 is formed along with the PDs 104 in the image-capture chip 113.

The analog pixel signals outputted through the multiplexer 411 are amplified by an amplifier 412 which is formed in the signal processing chip 111. The pixel signals amplified by the amplifier 412 are subjected to correlated double sampling (CDS) and analog-to-digital (A/D) conversion by a signal processing circuit 413 formed in the signal processing chip 111 and configured to perform CDS and A/D conversion. Since the pixel signals are subjected to CDS by the signal processing circuit 413, the noise in the pixel signals is reduced. The A/D-converted pixel signals are passed to a demultiplexer 414 and then stored in corresponding pixel memories 415. The demultiplexer 414 and pixel memories 415 are formed in the memory chip 112.

An arithmetic circuit 416 processes the pixel signals stored in the pixel memories 415 and passes the resulting signals to a subsequent image processing unit. The arithmetic circuit 416 may be disposed in any of the signal processing chip 111 and memory chip 112. While the elements connected to the single unit group 131 are shown in FIG. 4, these elements are disposed for each unit group 131 in practice and operate in parallel. Note that the arithmetic circuit 416 need not necessarily be disposed for each unit group 131. For example, a single arithmetic circuit 416 may sequentially refer to and process the values in the pixel memories 415 corresponding to the respective unit groups 131.

As described above, the output lines 309 are disposed in a manner corresponding to the respective unit groups 131. In the image sensor 100, the image-capture chip 113, signal processing chip 111, and memory chip 112 are stacked. Accordingly, by using, as the output lines 309, the bumps 109 electrically connecting between the chips, the lines can be routed without enlarging the chips in the surface direction.

Figure 5:
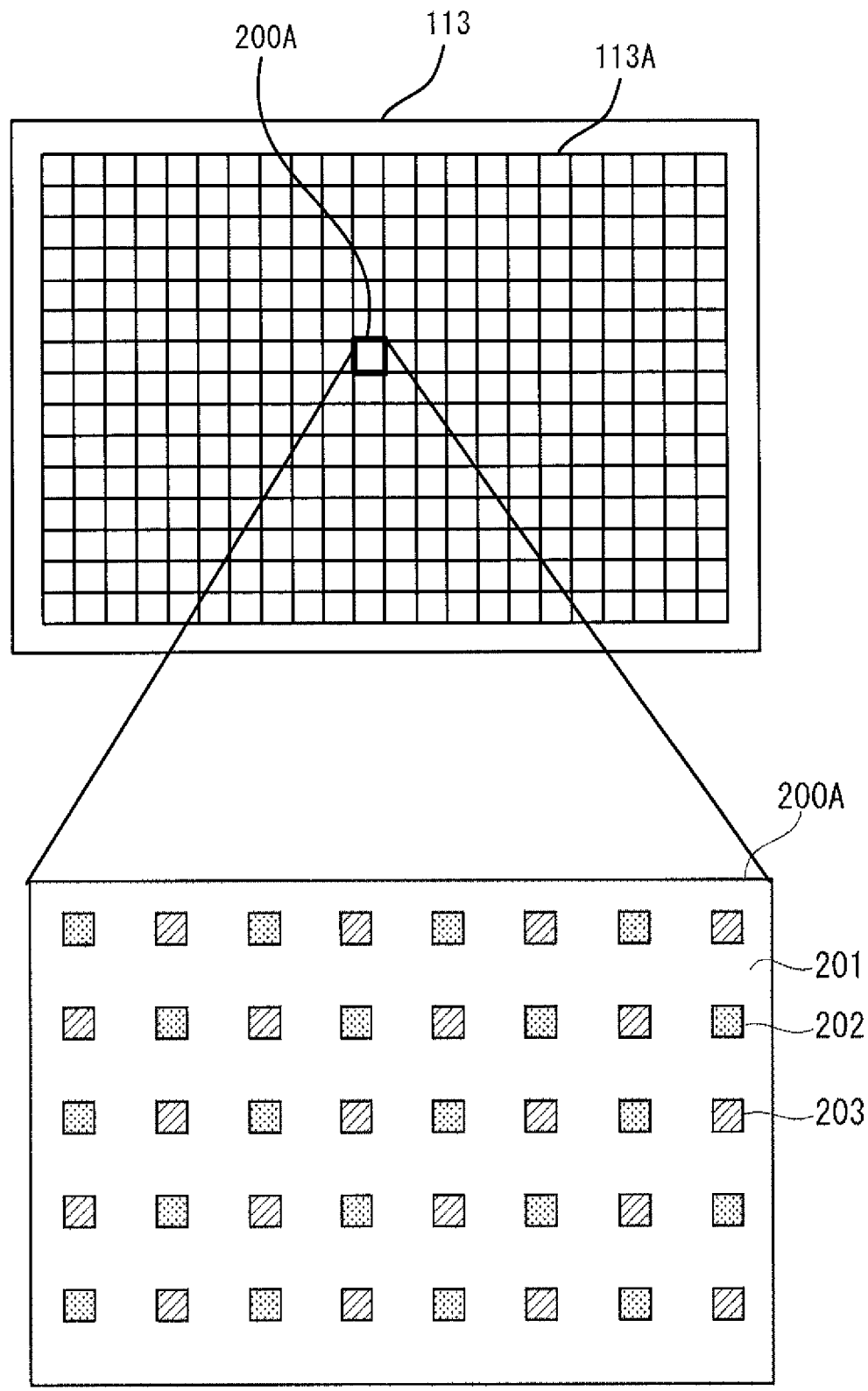
FIG. 5 is a diagram showing multiple blocks of the first embodiment and multiple regions in a block.

Next, blocks set in a pixel region 113A (see FIG. 2) of the image capture chip 113 and regions set in the blocks will be described. FIG. 5 is a diagram showing multiple blocks 200A of the first embodiment and multiple regions, 201, 202, and 203, in a block 200A. As shown in FIG. 5, the pixel region 113A of the image capture chip 113 is divided into the multiple blocks 200A. Each block 200A includes at least one unit group 131. Pixels included in the respective blocks 200A are controlled by different control parameters. That is, pixels included in one block and pixels included in another block output pixel signals based on different control parameters. Examples of a control parameter include the charge accumulation time or frequency, the frame rate, the gain, the thinning-out rate (pixel thinning-out rate), the number of rows or columns whose pixel signals are summed up (pixel summation count), and the digitized bit number. The control parameters may be parameters used in image processing following the acquisition of image signals from the pixels.

In the present embodiment, one of the blocks in the pixel region 113A may be referred to as a "first region," and another block may be referred to as a "second region." The image sensor 100 can be said to be an image sensor that can receive a light beam from a subject in the first and second regions and capture images in the first and second regions using different control parameters.

As shown in a partial enlarged view in FIG. 5, the first metering region 201, second metering regions 202, and third metering regions 203 are disposed in the block 200A. The light beam from the subject is metered in the first metering region 201, second metering regions 202, and third metering regions 203 controlled by different control parameters (e.g., charge accumulation time or frequency, frame rate, gain). A control parameter which allows for correct exposure (that is, a control parameter which allows the brightness of an image to be correct) is set for the first metering region 201; a control parameter which allows for overexposure, which is higher exposure than correct exposure, is set for the second metering regions 202; and a control parameter which allows for underexposure, which is lower exposure than correct exposure, is set for the third metering regions 203. As seen above, the image sensor 100 of the present embodiment can capture images in the respective blocks 200A using different control parameters and output pixel signals, as well as can capture images in the respective metering regions of each block 200A using different control parameters and output pixel signals.

As shown in the partial enlarged view in FIG. 5, the second metering regions 202 are formed discretely and uniformly in the block 200A, and the third metering regions 203 are also formed discretely and uniformly in the block 200A. The second metering regions 202 and third metering regions 203 are formed as small square regions. In the example shown in FIG. 5, the second metering regions 202 and third metering regions 203 are disposed alternately vertically and horizontally. In the block 200A, the first metering region 201 is a region other than the second metering regions 202 and third metering regions 203. The first metering region 201, second metering regions 202, and third metering regions 203 are defined in such a manner that the respective regions include at least one unit group 131.

In the example shown in FIG. 5, the second metering regions 202 and the third metering regions 203 have the same area. The first metering region 201 has a larger area than the second metering regions 202 and third metering regions 203. As seen above, in the block 200A, the first metering region 201 has an area proportion different from the second metering regions 202 and third metering regions 203. In the example shown in FIG. 5, it is assumed that a first metering region 201, second metering regions 202, and third metering regions 203 are set in every block 200A. However, a first metering region 201, second metering regions 202, and third metering regions 203 may be set only in predetermined multiple blocks of the blocks in the pixel region 113A. In this case, the predetermined blocks are disposed over the entire pixel region 113A so that light can be metered over the entire pixel region 113A. The blocks other than the predetermined blocks do not include any second metering regions 202 or third metering regions 203 but rather serve as a first metering region 201.

While, in FIG. 5, a small number of blocks 200A are set in the pixel region 113A to make it easy to see the disposition of the blocks 200A, a larger number of blocks 200A than the number of blocks shown in FIG. 5 may be set in the pixel region 113A.

Next, the control parameters will be described. The charge accumulation time refers to the time from when the PD 104s start to accumulate charge to when they end the accumulation. The charge accumulation time is also referred to as the exposure time or shutter speed. The charge accumulation frequency refers to the frequency with which the PDs 104 accumulate charge per unit time. The frame rate refers to the number of frames processed (displayed or recorded) per unit time in moving images. The frame rate is expressed in fps (frames per second). As the frame rate is increased, a subject (that is, an object whose image is captured) moves more smoothly in moving images.

The gain refers to the gain factor (amplification factor) of the amplifier 412. By changing the gain, the ISO sensitivity can be changed. The ISO sensitivity is a standard for photographic films developed by the ISO and represents the level of the weakest light which a photographic film can record. Typically, the sensitivity of image sensors 100 is represented by the ISO sensitivity. In this case, the ability of an image sensor 100 to capture light is represented by the ISO sensitivity value. When the gain is increased, the ISO sensitivity is increased as well. For example, when the gain is doubled, the electrical signal (pixel signal) is doubled as well. Thus, appropriate brightness is obtained even when the amount of incident light is halved. However, increasing the gain amplifies noise included in the electric signal, thereby increasing noise.

The thinning-out rate refers to the ratio of the number of pixels from which pixel signals are not read to the total number of pixels in a predetermined region. For example, a thinning-out rate of a predetermined region of 0 means that pixel signals are read from all the pixels in the predetermined region. A thinning-out rate of a predetermined region of 0.5 means that pixel signals are read from half the pixels in the predetermined region. Specifically, where a unit group 131 is a Bayer array, one Bayer array unit from which pixel signals are read and one Bayer array unit from which pixel signals are not read are set alternately vertically, in other words, that is, two pixels (two rows) from which pixel signals are read and two pixels (two rows) from which pixel signals are not read are set alternately vertically. On the other hand, when the pixels from which pixel signals are read are thinned out, the resolution of images is reduced. However, 20 million or more pixels are arranged in the image sensor 100 and therefore, even when the pixels are thinned out, for example, at a thinning-out rate of 0.5, images can be displayed with 10 million or more pixels.

The number of rows whose pixel signals are summed up refers to the number of vertically adjacent pixels whose pixel signals are summed up. The number of columns whose pixel signals are summed up refers to the number of horizontally adjacent pixels whose pixel signals are summed up. Such a summation process is performed, for example, in the arithmetic circuit 416. When the arithmetic circuit 416 sums up pixel signals of a predetermined number of vertically or horizontally adjacent pixels, there is obtained an effect similar to that obtained by thinning out the pixels at a predetermined thinning-out rate and reading pixel signals from the resulting pixels. In the summation process, an average value may be calculated by dividing the sum of the pixel signals by the row number or column number obtained by the arithmetic circuit 416.

The digitized bit number refers to the number of bits of a digital signal converted from an analog signal by the signal processing circuit 413. As the number of bits of a digital signal is increased, luminance, color change, or the like is represented in more detail.

In the present embodiment, the accumulation conditions refer to conditions on the accumulation of charge in the image sensor 100. Specifically, the accumulation conditions refer to the charge accumulation time or frequency, frame rate, and gain of the control parameters. Since the frame rate can vary with the charge accumulation time or frequency, it is included in the accumulation conditions. Similarly, the correct amount of exposure can vary with the gain, and the charge accumulation time or frequency can vary with the correct amount of exposure. For this reason, the gain is included in the accumulation conditions.

Since the correct amount of exposure varies with the charge accumulation time or frequency, frame rate, and gain, the accumulation conditions may be referred to exposure conditions (conditions on exposure) in the present embodiment.

In the present embodiment, the term "image capture conditions" refer to conditions on the capture of an image of a subject. Specifically, the image capture conditions refer to control parameters including the accumulation conditions. The image capture conditions includes control parameters for controlling the image sensor 100 (e.g., the charge accumulation time or frequency, frame rate, gain), as well as control parameters for controlling reading of signals from the image sensor 100 (e.g., thinning-out rate, the number of rows or columns whose pixel signals are summed up) and control parameters for processing signals from the image sensor 100 (e.g., digitized bit number, control parameters that the image processing unit 30 (to be discussed later) uses when processing images).

Figure 6:
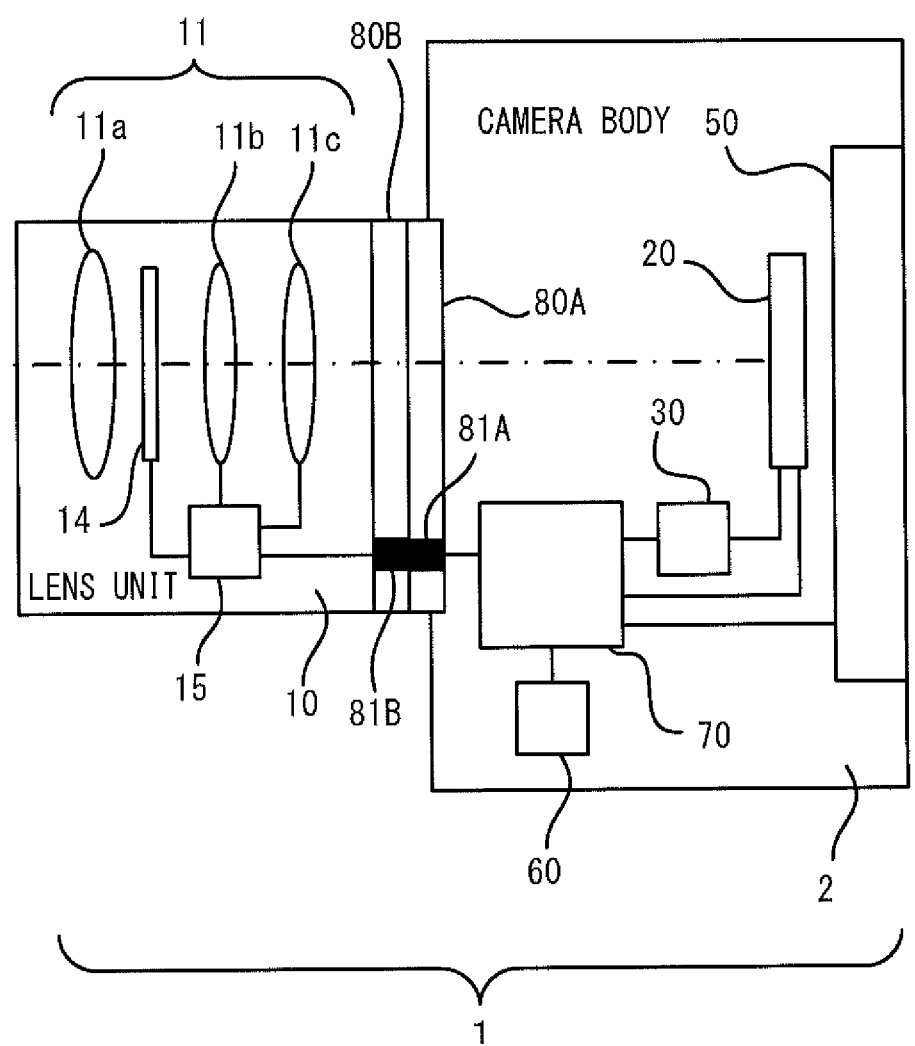
FIG. 6 is a cross-sectional view showing a schematic configuration of a digital camera which is an example of an electronic apparatus.

FIG. 6 is a cross-sectional view showing a schematic configuration of a digital camera 1, which is an example of an electronic apparatus. The digital camera 1 of the present embodiment includes a lens unit 10 and a camera body 2. The lens unit 10 is an interchangeable lens. The camera body 2 is provided with a body-side mounting unit 80A for mounting the lens unit 10. The lens unit 10 is provided with a lens-side mounting unit 80B corresponding to the body-side mounting unit 80A. When the user joins the body-side mounting unit 80A and lens-side mounting unit 80B together, the lens unit 10 is mounted on the camera body 2. Thus, an electrical contact 81A of the body-side mounting unit 80A and an electrical contact 81B of the lens-side mounting unit 80B are electrically connected together.

The lens unit 10 includes an imaging optical system 11, a diaphragm 14, and a lens drive control unit 15. The imaging optical system 11 includes a lens 11a, a zooming lens 11b, and a focusing lens 11c. The lens drive control unit 15 includes a lens-side central processing unit (CPU), a memory, and a drive control circuit. When the lens drive control unit 15 is electrically connected to a system control unit (control unit) 70 in the camera body 2 through the electrical contacts 81A and 81B, it transmits lens information about the optical characteristics of the imaging optical system 11 in the lens unit 10 and receives control information for driving the zooming lens 11b, focusing lens 11c, and diaphragm 14.

The lens-side CPU of the lens drive control unit 15 causes the drive control circuit to control the drive of the focusing lens 11c on the basis of control information that the system control unit 70 transmits in order to focus the imaging optical system 11. The lens-side CPU of the lens drive control unit 15 also causes the drive control circuit to control the drive of the zooming lens 11b on the basis of control information that the system control unit 70 transmits in order to adjust the zoom. The diaphragm 14 is disposed along the optical axis of the imaging optical system 11. The diaphragm 14 forms an aperture whose diameter with respect to the optical axis is variable, in order to adjust the amount of light and the amount of blur. The lens-side CPU of the lens drive control unit 15 causes the drive control circuit to control the drive of the diaphragm 14 on the basis of control information that the system control unit 70 transmits in order to adjust the aperture diameter of the diaphragm 14.

The camera body 2 includes an image capture unit 20, an image processing unit 30, a display unit 50, a recording unit CO, and the system control unit (control unit) 70. The image capture unit 20 includes the image sensor 100. The image sensor 100 receives a light beam emitted from the imaging optical system 11 of the lens unit 10. The pixels of the image sensor 100 photoelectrically convert the received light beam into pixel signals (these pixel signals will be included in image data). The image capture unit 20 then transmits raw data consisting of the pixel signals generated by the pixels (the raw data will be also included in the image data) to the image processing unit 30. The image processing unit 30 performs various types of image processing on the raw data consisting of the pixel signals to generate image data in a predetermined file format (e.g., JPEG). The display unit 50 displays the image data generated by the image processing unit 30. The recording unit 60 stores the image data generated by the image processing unit 30.

Hereafter, the "image data" may be referred to as the "image signal." Images include still images, moving images, and live view images. Live view images refer to images displayed on the display unit 50 on the basis of image data sequentially generated and outputted by the image processing unit 30. Through live view images, the user checks images of a subject being captured by the image capture unit 20. Live view images are also called through images or preview images.

The system control unit 70 controls the entire processing and operation of the digital camera 1. The processing and operation of the system control unit 70 and the internal configuration of the camera body 2 will be described in detail below with reference to FIG. 7.

Figure 7:
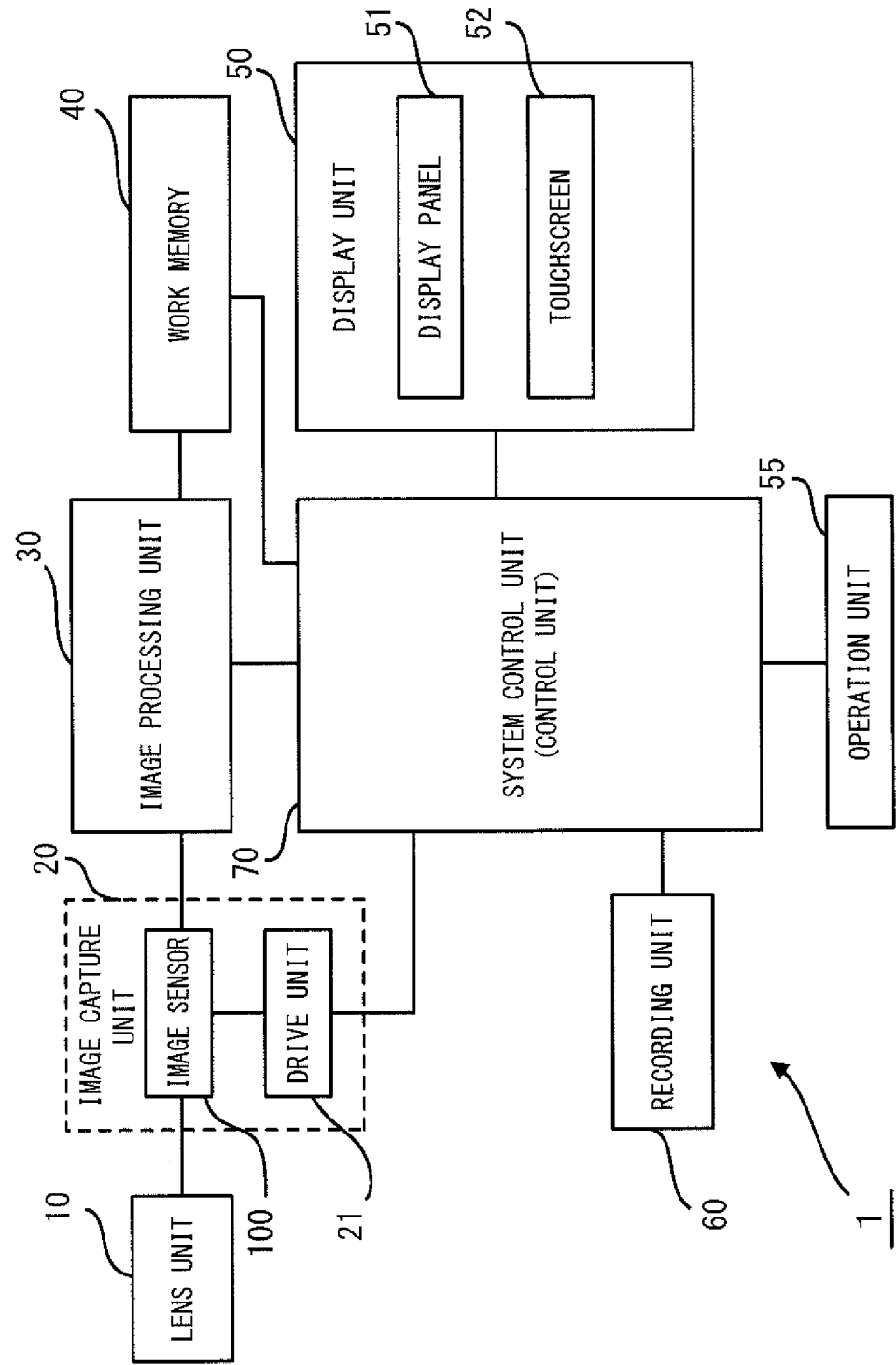
FIG. 7 is a block diagram showing the configuration of the digital camera of the first embodiment.

FIG. 7 is a block diagram showing the configuration of the digital camera 1 of the first embodiment. As shown in FIG. 7, the digital camera 1 includes the camera body 2 and lens unit 10. As described above, the lens unit 10 is an interchangeable lens which is detachable from the camera body 2. Accordingly, the digital camera 1 need not include the lens unit 10. Note that the lens unit 10 may be integral with the digital camera 1. The lens unit 10 connected to the camera body 2 guides a light emitted from a subject to the image capture unit 20.

As described above, the lens unit 10 includes the lens drive controller 15 (see FIG. 6). The lens unit 10 also includes the lenses constituting the imaging optical system 11, that is, the lens 11a, zooming lens 11b, and focusing lens 11c. When the lens unit 10 is connected to the camera body 2, the lens drive controller 15 transmits lens information stored in the memory to the system control unit of the camera body 2. Also, when the lens unit 10 is connected to the camera body 2, the lens drive controller 15 receives control information (the amount of movement, f-number, or the like) from the system control unit 70 and controls the drive of the zooming lens 11b, focusing lens 11c, and diaphragm 14 on the basis of the control information. The drive control of the focusing lens 11c aims to focus the focusing lens 11c and is called automatic focusing (AF). The drive control of the diaphragm 14 aims to adjust the aperture diameter of the diaphragm 14 and is called automatic exposure (AE).

As shown in FIG. 7, the camera body 2 includes the image capture unit 20, the image processing unit 30, a work memory 40, the display unit 50, an operation unit 55, the recording unit 60, and the system control unit 70.

The image capture unit 20 includes the image sensor 100 and a drive unit 21. The drive unit 21 is a control circuit that controls the drive of the image sensor 100 in accordance with an instruction from the system control unit 70. Specifically, the drive unit 21 controls the charge accumulation time or frequency serving as a control parameter by controlling the timing (or the cycle of the timing) when reset pulses or transfer pulses are applied to the reset transistors 303 or transfer transistors 302, respectively. The drive unit 21 also controls the frame rate by controlling the timing (or the cycle of timing) when reset pulses, transfer pulses, or selection pulses are applied to the reset transistors 303, transfer transistor 302, or select transistors 305, respectively. The drive unit 21 also controls the thinning-out rate by setting pixels to which reset pulses, transfer pulses, or selection pulses are applied.

The drive unit 21 also controls the ISO sensitivity of the image sensor 100 by controlling the gain (also called the gain factor or amplification factor) of the amplifier 412. The drive unit 21 also sets the number of rows or columns whose pixel signals are summed up by transmitting an instruction to the arithmetic circuit 416. The drive unit 21 also sets the digitized bit number by transmitting an instruction to the signal processing circuit 413. The drive unit 21 also sets a region(s) in the pixel region (image capture region) 113A of the image sensor 100 in units of blocks 200A, as well as sets metering regions 201, 202, and 203 in each block 200A. As seen above, the drive unit 21 serves as an image sensor control unit that causes the image sensor 100 to capture images in the respective blocks 200A on different image capture conditions and to output pixel signals, as well as causes the image sensor 100 to capture images in the metering regions 201, 202, and 203 of each block 200A on different image capture conditions and to output pixel signals. The system control unit 70 transmits an instruction about the positions, shapes, ranges, or the like of the blocks 200A to the drive unit 21. The system control unit 70 also transmits an instruction about the positions, shapes, ranges, or the like of the metering regions 201, 202, and 203 to the drive unit 21.

The image sensor 100 passes the pixel signals from the image sensor 100 to the image processing unit 30. The image processing unit 30 performs various types of image processing on raw data consisting of the pixel signals using the work memory 40 as work space to generate image data in a predetermined file format (e.g., JPEG). For example, the image processing unit 30 performs the following image processing: it performs color signal processing (color tone correction) on signals obtained from a Bayer array so as to generate RGB image signals, performs image processing such as white balance adjustment, sharpness adjustment, gamma correction, and gradation adjustment on the RGB image signals, and optionally compresses the resulting signals in a predetermined compression format (JPEG format, MPEG format, or the like). The image processing unit 30 then outputs the resulting image data to the recording unit 60. The image processing unit 30 also outputs the image data to the display unit 50.

Parameters that the image processing unit 30 refers to when performing image processing are also included in the control parameters (image capture conditions). For example, parameters, such as color signal processing (color tone correction), white balance adjustment, gradation adjustment, and compressibility, are included in the control parameters. The signals read from the image sensor 100 varies with the charge accumulation time or the like, and the parameters that the image processing unit 30 refers to when performing image processing varies with the variations in the signals. The image processing unit 30 sets different control parameters for the respective blocks 200A and for the metering regions 201, 202, and 203 and performs image processing, such as color signal processing, on the basis of these control parameters.

In the present embodiment, the image processing unit detects a main subject using a known face detection function on the basis of the generated image data. The image processing unit 30 may detect a moving subject as a main subject by making comparisons among multiple pieces of image data chronologically obtained. In addition to face detection, the image processing unit 30 may detect a human body included in the image data as a main subject, as described in Japanese Unexamined Patent Application Publication No. 2010-16621 (US 2010/0002940).

As used herein, the term "main subject" refers to a subject which is noted, or believed to be noted, by the user (operator), of subjects whose images are captured. The number of main subjects in image data is not limited to one, and multiple main subjects may exist therein.

The work memory 40 temporarily stores the image data resulting from the image processing by the image processing unit 30 and other data. The display unit 50 displays the images (still images, moving images, live view images) captured by the image capture unit 20 and various types of information. The display unit 50 includes a display panel 51, such as a liquid crystal display panel. The display panel 51 of the display unit 50 has a touchscreen 52 thereon. When the user touches the touchscreen 52 to perform an operation, such as selection of a menu, the touchscreen 52 outputs a signal indicating the touched position to the system control unit 70.

The operation unit 55 includes various types of operation switches operated by the user, including a release switch (a switch pressed to capture a still image) and a moving image switch (a switch pressed to capture a movement). The operation unit 55 outputs a signal corresponding to an operation performed by the user to the system control unit 70. The recording unit 60 has a card slot into which a storage medium, such as a memory card, can be inserted. The recording unit 60 stores the image data generated by the image processing unit 30 and various types of data in a storage medium inserted in the card slot. The recording unit 60 also includes an internal memory. The recording unit 60 may store the image data generated by the image processing unit 30 and various types of data in the internal memory.

The system control unit 70 controls the entire processing and operation of the digital camera 1. The system control unit 70 includes a body-side central processing unit (CPU). In the present embodiment, the system control unit 70 divides the image capture surface (pixel region 113A) of the image sensor 100 (image capture chip 113) into multiple blocks 200A and causes the image sensor 100 to capture images in the blocks 200A with different charge accumulation times (or charge accumulation frequencies), different frame rates, and/or different gains. The system control unit 70 also divides each block 200A into a first metering region 201, second metering regions 202, and third metering regions 203 and causes the image sensor 100 to capture images in the metering regions 201, 202, and 203 with different charge accumulation times (or charge accumulation frequencies), different frame rates, and/or different gains. For this purpose, the system control unit 70 transmits, to the drive unit 21, a signal indicating the positions, shapes, and ranges of the blocks 200A and the image capture conditions for the blocks 200A. The system control unit 70 also transmits, to the drive unit 21, a signal indicating the positions, shapes, and ranges of the metering regions 201, 202, and 203 in each block 200A and the image capture conditions for the metering regions 201, 202, and 203.

The system control unit 70 also causes the image sensor 100 to capture images in the respective blocks 200A, as well as in the metering regions 201, 202, and 203 at different thinning-out rates, the different numbers of rows or columns whose pixel signals are summed up, and/or different digitized bit numbers. For this purpose, the system control unit 70 transmits, to the drive unit 21, a signal indicating the image capture conditions (thinning-out rates, the numbers of rows or columns whose pixel signals are summed up, and/or digitized bit numbers) for the respective blocks 200A and the image capture conditions for the metering regions 201, 202, and 203. The image processing unit 30 performs image processing on image capture conditions (control parameters, such as color signal processing, white balance adjustment, gradation adjustment, and compressibility) which vary among the blocks 200A and among the metering regions 201, 202, and 203. For this purpose, the image processing unit 70 transmits, to the image processing unit 30, a signal indicating the image capture conditions (control parameters, such as color signal processing, white balance adjustment, gradation adjustment, and compressibility) for the blocks 200A and the image capture conditions for the metering regions 201, 202, and 203.

The system control unit 70 stores the image data generated by the image processing unit 30 in the recording unit 60. The system control unit 70 also outputs the image data generated by the image processing unit 30 to the display unit 50 so as to display images on the display unit 50. The system control unit 70 also reads image data stored in the recording unit 60 and outputs it to the display unit 50 so as to display images on the display unit 50. Images displayed on the display unit 50 include still images, moving images, and live view images.

In the present embodiment, the system control unit 70 sets image capture conditions for the respective regions of the pixel region 113A. That is, the system control unit 70 sets image capture conditions for the respective blocks 200A of the pixel region 113A, as well as sets image capture conditions for the first metering region 201, second metering regions 202, and third metering regions 203 of each block 200A. The system control unit 70 also controls the drive of the image sensor 100 so that images are captured in the respective regions of the pixel region 113A.

Figure 8:
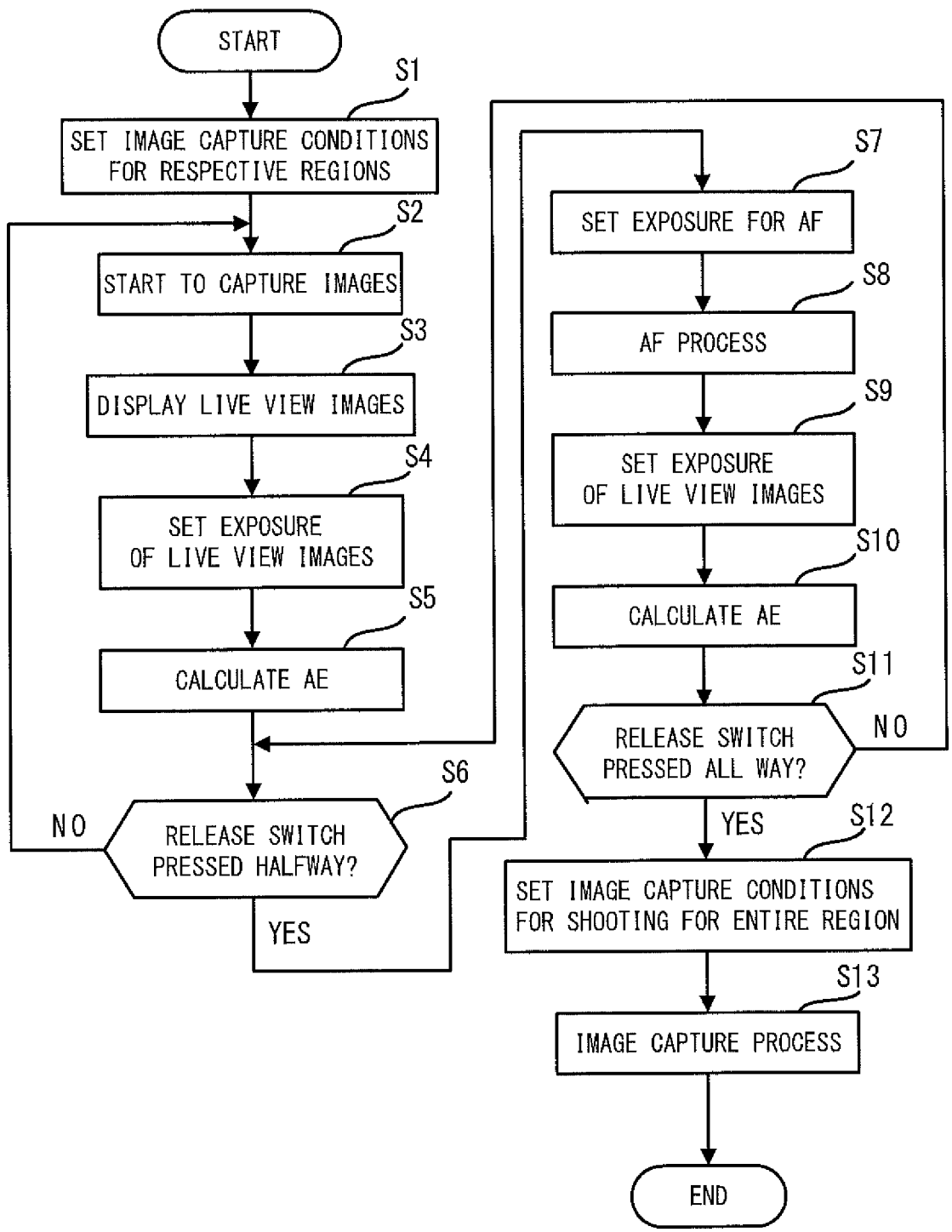
FIG. 8 is a flowchart showing an image capture operation performed by a system control unit of the first embodiment.

Also, in response to a halfway press of the release switch, the system control unit 70 performs focusing (AF) called contrast AF so that the contrast of a subject is maximized (see step S8 in FIG. 8). Specifically, the system control unit 70 transmits control information to the lens drive controller 15 through the electrical contacts 81A and 81B so as to cause the lens drive controller 15 to move the focusing lens 11c. The system control unit 70 also acquires, from the image processing unit 30, a contrast signal indicating the contrast of an image of a subject captured by the image capture unit 20 (if the image processing unit 30 detects a main subject, the system control unit 70 acquires an evaluation value of the contrast of an image of the main subject). On the basis of the contrast signal from the image processing unit 30, the system control unit 70 detects, as the focal position, the position of the focusing lens 11c in which the contrast of the subject image becomes highest while causing the lens drive controller 15 to move the focusing lens 11c. The system control unit 70 then transmits a control signal to the lens drive controller 15 to cause the lens drive controller 15 to move the focusing lens 11c to the detected focal position.

The system control unit 70 also performs automatic exposure (AE) while capturing live view images (see steps S4, S5 in FIG. 8). Even when the release switch is pressed halfway, the system control unit 70 performs automatic exposure (AE) (see steps S9, S10 in FIG. 8). Specifically, the system control unit 70 acquires, from the image processing unit 30, luminance distribution data indicating the luminance distribution of images. At this time, the system control unit 70 acquires luminance distribution data of an image corresponding to the first metering region 201, luminance distribution data of an image corresponding to the second metering regions 202, and luminance distribution data of an image corresponding to the third metering regions 203. The system control unit 70 then performs metering using these pieces of luminance distribution data. The system control unit 70 then determines image capture conditions [the shutter speed (exposure time, charge accumulation time), frame rate, and gain (ISO sensitivity)] and the f-number on the basis of the metering result. At this time, the system control unit 70 can determine image capture conditions such that correct exposure is obtained in the respective blocks 200A in the pixel region 113A of the image sensor 100. Note that f-numbers cannot be set for the respective blocks 200A but rather the determined f number is set for the entire pixel region 113A.

The system control unit 70 transmits, to the lens drive controller 15, control information indicating an f-number corresponding to correct exposure so as to cause the lens drive controller 15 to perform drive control for adjusting the aperture of the diaphragm 14. The system control unit 70 also outputs, to the drive unit 21, an instruction signal indicating a shutter speed (charge accumulation time), frame rate, and gain (ISO sensitivity) corresponding to correct exposure. The drive unit 21 controls the drive of the image sensor 100 at the shutter speed, frame rate, and gain indicated by the instruction signal.

The system control unit 70 is implemented when the body-side CPU performs processing on the basis of a control program.

While, in the above example, the system control unit 70 performs AF in response to a halfway press of the release switch, it may further perform AF during the capture of live view images or moving images. While the system control unit 70 performs AF during the capture of live view images and in response to a halfway press of the release switch, it may further perform AF during the capture of moving images.

Next, an image capture operation of the digital camera 1 will be described. FIG. 8 is a flowchart showing an image capture operation performed by the system control unit 70 of the first embodiment. In the process shown in FIG. 8, the user powers on the digital camera 1 and then operates the operation unit 55 or the like to start to capture images and thus the system control unit 70 sets image capture conditions for the respective regions of the pixel region 113A of the image sensor 100 (step S1). At this time, the system control unit 70 sets initial image capture conditions (control parameters). Specifically, the system control unit 70 sets, for the first metering region 201 of each block 200A, initial image capture conditions for correct exposure of live view images (predetermined standard image capture conditions on which correct exposure is assumed to be obtained). The system control unit 70 also sets, for the second metering regions 202 of each block 200A, initial image capture conditions for overexposure (predetermined standard image capture conditions on which overexposure is assumed to be obtained). The system control unit 70 also sets, for the third metering regions 203 of each block 200A, initial image capture conditions for underexposure (predetermined standard image capture conditions on which underexposure is assumed to be obtained).

The charge accumulation time for overexposure is longer than that for correct exposure, and the gain for overexposure is higher than that for correct exposure. The charge accumulation time for underexposure is shorter than that for correct exposure, and the gain for underexposure is lower than that for correct exposure. In step S1, the system control unit 70 also sets the f-number (initial f-number). The system control unit 70 then outputs, to the drive unit 21, an instruction signal indicating the image capture conditions for the metering regions 201, 202, and 203.

Then, the system control unit 70 starts an image capture operation (step S2). Specifically, the system control unit 70 outputs an instruction signal to the drive unit 21 so as to cause the drive unit 21 to control the drive of the image sensor 100 on the image capture conditions indicated in step S1.

Figure 9:
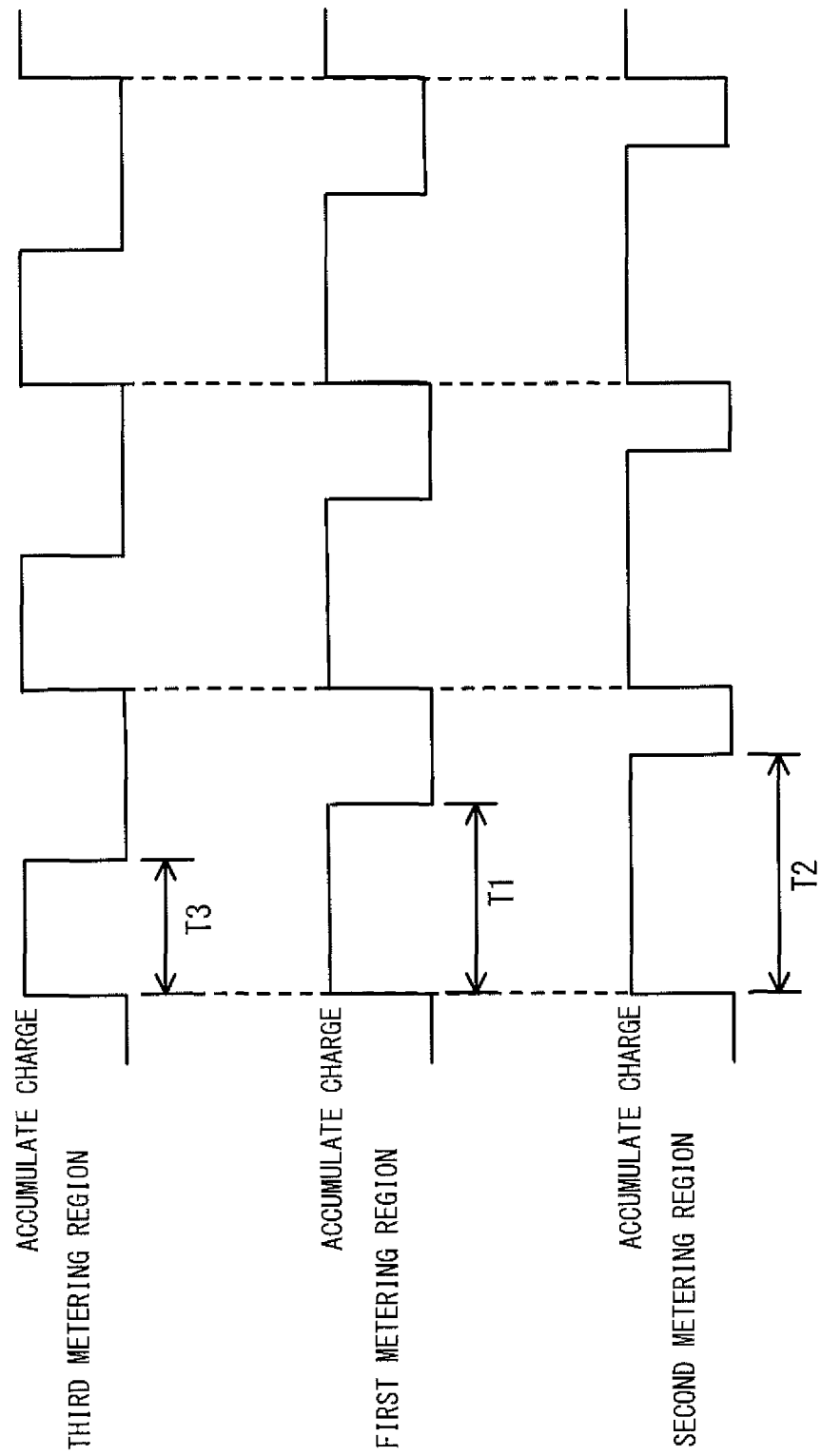
FIG. 9 is a timing chart showing the timings when charge is accumulated in multiple regions of a block of the first embodiment.

FIG. 9 is a timing chart showing the timings when charge is accumulated in the regions 201, 202, and 203 of a block 200A of the first embodiment. As shown in FIG. 9, the drive unit 21 causes the pixels in the first metering region 201 to repeatedly accumulate charge for a charge accumulation time (exposure time) T1. The drive unit 21 also causes the pixels in the second metering regions 202 to repeatedly accumulate charge for a charge accumulation time T2 which is longer than the charge accumulation time T1. The drive unit 21 also causes the pixels in the third metering regions 203 to repeatedly accumulate charge for a charge accumulation time T3 which is shorter than the charge accumulation time T1. Note that the first metering region 201, second metering regions 202, and third metering regions 203 have the same frame rate. Thus, pixel signals read from the pixels of the first metering region 201 of the image sensor 100 are outputted to the image processing unit 30. Pixel signals read from the pixels of the second metering regions 202 of the image sensor 100 are outputted to the image processing unit 30. Pixel signals read from the pixels of the third metering regions 203 of the image sensor 100 are outputted to the image processing unit 30.

When the capture of images starts, the system control unit 70 displays, on the display panel 51 of the display unit 50, live view images captured in the first metering region 201 of the image sensor 100 (step S3). As seen above, the display panel 51 of the display unit 50 displays only the live view images captured in the first metering region 201 and does not display live view images captured in any of the second metering region 202 and third metering region 203. That is, images captured in the second metering regions 202 and third metering regions 203 are used for metering.

Figure 10:
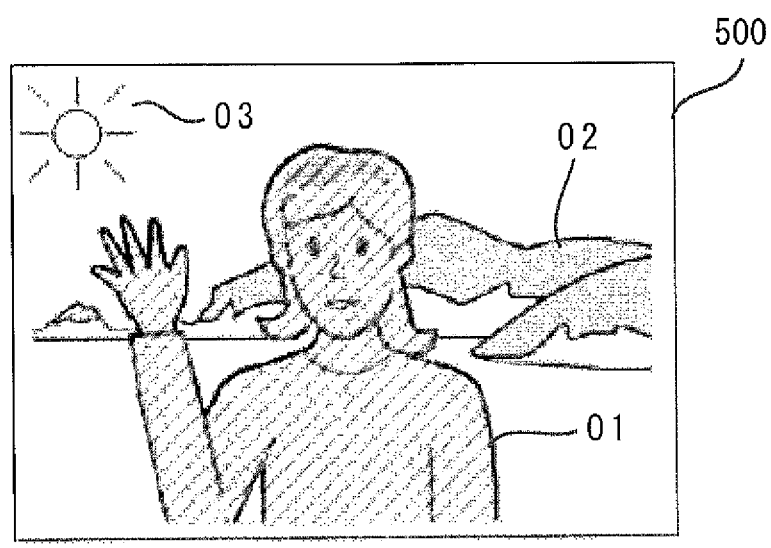
FIG. 10 is a drawing showing an example display of a backlight scene of the first embodiment.

FIG. 10 is a drawing showing an example display of a backlight scene 500 of the first embodiment. The backlight scene 500 shown in FIG. 10 is a scene displayed on the display panel 51 of the display unit 50. The backlight scene 500 includes a person O1, a background O2 including a mountain, a sea, and a cloud, the sun O3. Since the sun O3 lies behind the person O1, the person O1 is backlighted and is suffering crushed blacks. On the other hand, the sun O3, and the sea surface, cloud, and the like receiving direct light from the sun O3 are suffering blown-out highlights.

Then, the system control unit 70 sets the exposure of live view images as follows (step S4). When power is turned on, the system control unit 70 sets initial charge accumulation times, gains, and f-numbers for the first metering region 201, second metering regions 202, and third metering regions 203, as the exposure of live view images. Further, after image capture is started, the system control unit 70 sets, for the first metering region 201, the charge accumulation time, gain, and f-number for correct exposure calculated in AE calculation of step S5; sets, for the second metering regions 202, the charge accumulation time, gain, and f-number for overexposure calculated in AE calculation of step S5; and sets, for the third metering regions 203, the charge accumulation time, gain, and f-number for underexposure calculated in AE calculation of step S5.

Then, the system control unit 70 calculates AE, that is, calculates the correct exposure, overexposure, and underexposure of live view images on the basis of luminance distribution data of live view images outputted from the image processing unit 30 (step S5). As an example, the system control unit 70 sets the overexposure to ½ the saturation level of the block 200A (the luminance level at which blown-out highlights occur); sets the correct exposure to ⅛ the saturation level; and sets the underexposure to 1/32 the saturation level. That is, the system control unit 70 sets the overexposure to four times the correct exposure and sets the underexposure to ¼ the correct exposure.

The system control unit 70 then corrects the correct exposure of live view images set for the first metering region 201 of the block 200A on the basis of luminance distribution data of live view images captured on the image capture conditions (charge accumulation time, gain) and f-number for the correct exposure (⅛ the saturation level). In this case, the system control unit 70 may correct the correct exposure of the entire field (entire live view images displayed on the display panel 51) or the correct exposure of each block 200A (further, each pixel) on the basis of the result of the metering in the first metering region 201.

Further, on the basis of the luminance distribution data of an image captured in the second metering regions 202 of the block 200A on the image capture conditions (charge accumulation time, gain) and f-number for the overexposure (½ the saturation level), the system control unit 70 corrects the overexposure of this image. Specifically, if the image captured on the image capture conditions and f-number for the overexposure (½ the saturation level) is suffering crushed blacks, the system control unit 70 determines that the overexposure is too low. In this case, the system control unit 70 gradually increases the overexposure luminance level until the crushed blacks are eliminated. If the image processing unit 30 detects a face on the basis of the image captured in the second metering regions 202, the system control unit 70 may correct the exposure in such a manner that a block 200A in which the face has been detected is exposed correctly. In this case, the system control unit may apply the same amount of correction to the entire field, or may set the amounts of correction for the respective blocks 200A, or may set the amount of correction only for the block 200A in which the face has been detected.

Further, on the basis of the luminance distribution data of an image captured in the third metering regions 203 of the block 200A on the image capture conditions (charge accumulation time, gain) and f-number for the underexposure (1/32 the saturation level), the system control unit 70 corrects the underexposure of this image. Specifically, if the image captured on the image capture conditions and f-number for the underexposure (1/32 the saturation level) is suffering blown-out highlights (saturation), the system control unit 70 determines that the underexposure is too high. In this case, the system control unit 70 gradually reduces the underexposure luminance level until the blown-out highlights are eliminated. The correct exposure luminance level may be midway between the overexposure and underexposure luminance levels. In this case, the system control unit may apply the same amount of correction to the entire field or may set the amounts of correction for the respective blocks 200A.

As seen above, the system control unit 70 sets the exposure (image capture conditions and f-number) of live view images in step S4 on the basis of the correct-exposure, overexposure, and underexposure luminance levels calculated by the system control unit 70. The image processing unit 30 adjusts the white balance of live view images in accordance with the exposure of live view images set by the system control unit 70 in step S4.

Figure 11:
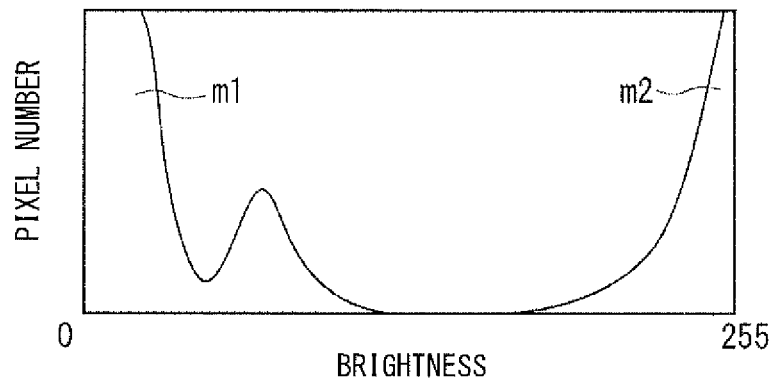
FIG. 11 is a diagram showing a histogram of a correctly exposed image in the backlight scene.

FIG. 11 is a diagram showing a histogram of a correctly exposed image of the backlight scene 500 (an image in the first metering regions 201 of the respective blocks 200A). In the histogram shown in FIG. 11, the horizontal axis represents the brightness of pixels (luminance level, illuminance, gradation). The brightness is the lowest (completely black) at "0" and becomes higher at righter positions on the horizontal axis. The brightness is the highest (completely white) at "255" on the horizontal axis. The vertical axis indicates how many pixels is making each brightness level (that is, the vertical axis represents the number of pixels making the same brightness). In the histogram shown in FIG. 11, m1 is a portion corresponding to an image of the person O1, and m2 is a portion corresponding to images of the sun O3 and its vicinity. As seen above, the person O1, which a low-luminance subject, is suffering crushed blacks in the image captured in the first metering region 201 on the image capture conditions for correct exposure. Accordingly, the system control unit 70 cannot detect the luminance level on the basis of the luminance distribution data of the person O1. On the other hand, the sun O3 and the like, which are high-luminance subjects, are suffering blown-out highlights. Accordingly, the system control unit 70 cannot detect the luminance level on the basis of the luminance distribution data of the sun O3 and the like.

Figure 12:
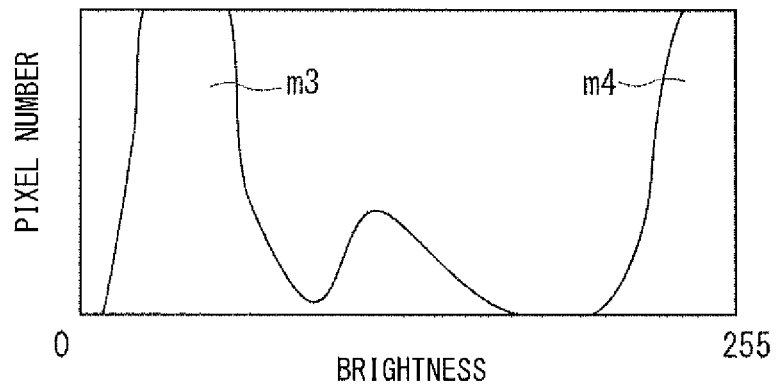
FIG. 12 is a diagram showing a histogram of an overexposed image in the backlight scene.

FIG. 12 is a diagram showing a histogram of an overexposed image of the backlight scene 500 (an image in the second metering regions 202 of the respective blocks 200A). The histogram shown in FIG. 12 is a histogram obtained by shifting the histogram shown in FIG. 11 to the right. In the histogram shown in FIG. 12, m3 is a portion corresponding to an image of the person O1, and m4 is a portion corresponding to images of the sun O3 and its vicinity. As seen above, the person O1, which a low-luminance subject, is not suffering crushed blacks in the image captured in the second metering regions 202 on the image capture conditions for overexposure and therefore the image processing unit 30 can detect a face. Accordingly, the system control unit 70 can detect the luminance level on the basis of luminance distribution data of a low-luminance subject, such as the person O1.

Figure 13:
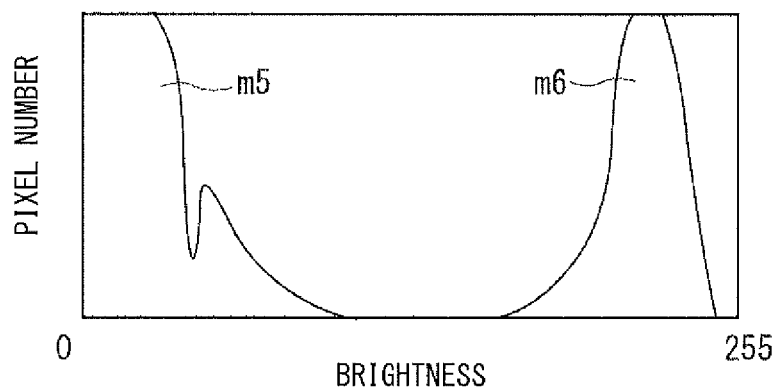
FIG. 13 is a diagram showing a histogram of an underexposed image in the backlight scene.

FIG. 13 is a diagram showing a histogram of an underexposed image of the backlight scene 500 (an image in the third metering regions 203 of the respective blocks 200A). The histogram shown in FIG. 13 is a histogram obtained by shifting the histogram shown in FIG. 11 to the left. In the histogram shown in FIG. 13, m5 is a portion corresponding to an image of the person O1, and m6 is a portion corresponding to images of the sun O3 and its vicinity. As seen above, the sun O3 and the like, which are high-luminance subjects, are not suffering blown-out highlights in the image captured in the third metering regions 203 on the image capture conditions for underexposure. Accordingly, the system control unit 70 can detect the luminance levels of even high-luminance subjects, such as the sun O3, on the basis of luminance distribution data. Although FIGS. 11 to 13 show histograms of the entire field, the system control unit 70 may detect the luminance level of each block 200A (further, each pixel) on the basis of a histogram of each block 200A (each pixel).

Referring back to FIG. 8, the system control unit 70 determines whether the release switch has been pressed halfway (SW1 operation) (step S6). The system control unit repeatedly performs steps S2 to S5 until the release switch is pressed halfway. If it determines that the release switch has been pressed halfway, the system control unit 70 sets accumulation conditions used in AF (step S7). The system control unit 70 then performs contrast AF on the basis of the evaluation value of the contrast of a main subject image captured on the accumulation conditions for AF set in step S7 (step S8).

Specifically, the system control unit 70 acquires, from the image processing unit 30, a contrast signal indicating the evaluation value of the contrast of a main subject image captured by the image capture unit 20 on the image capture conditions (the image capture conditions for correct exposure, the image capture conditions for overexposure, or the image capture conditions for underexposure) and the f-number set in step S7. The system control unit 70 then detects the position of the focusing lens 11c in which the contrast of the main subject image becomes highest, as the focal position on the basis of the contrast signal from the image processing unit 30 while moving the focusing lens 11c. The system control unit 70 then transmits a control signal to the lens drive controller 15 so as to cause the lens drive controller 15 to move the focusing lens 11c to the detected focal position.

Then, the system control unit 70 sets the exposure of live view images (step S9) and calculates AE (step S10). Steps S9 and S10 correspond to steps S4 and S5. Specifically, even when the release switch is being pressed halfway, the system control unit 70 detects the luminance level of live view images on the basis of image data from the first metering region 201, second metering regions 202, and third metering regions 203. The system control unit 70 then sets image capture conditions for the first metering region 201, second metering regions 202, and third metering regions 203 on the basis of the luminance level of live view images.

The system control unit 70 then determines whether the release switch has been pressed all the way (SW2 operation) (step S11). If it determines that the release switch has not been pressed all the way, the system control unit 70 repeatedly performs steps S6 to S10 described above. If it determines that the release switch has been pressed all the way, the system control unit 70 sets image capture conditions for shooting for the entire pixel region 113A of the image sensor 100 (step S12). The image capture conditions for shooting are image capture conditions on which a real image is captured in step S13. Specifically, the system control unit 70 determines image capture conditions for the respective blocks 200A suitable for the subject on the basis of the luminance levels for correct exposure, overexposure, and underexposure calculated in AE calculation of step S10, and then sets the image capture conditions for the respective blocks 200A as image capture conditions for shooting. The system control unit 70 then outputs, to the drive unit 21, an instruction signal indicating the image capture conditions for shooting.

Then, the system control unit 70 performs an image capture process (step S13). Specifically, the system control unit 70 outputs, to the image capture unit 20, an instruction signal instructing the image capture unit 20 to capture an image. The drive unit 21 captures an image by controlling the drive of the image sensor 100 on the image capture conditions for shooting. At this time, an image is captured in the pixels of each block 200A on the same image capture conditions. Specifically, any first metering region 201, second metering regions 202, or third metering regions 203 are not set in each block 200A and therefore an image is captured in the respective blocks 200A on the same image capture conditions.

As described above, the digital camera 1 of the first embodiment includes the image sensor 100, which can receive a light beam from a subject in the first region (one block 200) and the second region (another block) and capture images in the first region and second region on different conditions, and the control unit 70, which controls image capture by applying multiple image capture conditions to a first process (e.g., AE) at least in the first region.

According to this configuration, it is possible to perform metering with high accuracy by capturing images in one region (at least in the first region) on multiple image capture conditions. As a result, the control unit 70 can capture images having a wide dynamic range. Further, the image processing unit 30 can accurately determine a light source, such as a fluorescent lamp or LED, using images captured on multiple image capture conditions, allowing for an improvement in the accuracy of various types of image processing.

Further, the system control unit 70 of the first embodiment controls image capture by applying multiple image capture conditions to a second process (e.g., AF) different from the first process (e.g., AE). According to this configuration, the control unit 70 can capture images on image capture conditions on which the evaluation value of the contrast of a subject image is increased. Thus, an improvement is made in the accuracy with which the focal position is adjusted in AF.

Further, in the first embodiment, the system control unit 70 controls image capture in image capture areas corresponding to multiple image capture conditions. According to this configuration, for example, it is possible to increase the image capture area of the region 201, in which images are captured on the image capture conditions for correct exposure, and to reduce the image capture areas of the regions 202 and 203, in which images are captured on the image capture conditions for overexposure or underexposure.

Further, in the first embodiment, the control unit 70 sets multiple image capture conditions in accordance with the saturation level of the first region. According to this configuration, it is possible to set multiple image capture conditions suitable for a subject, for example, image capture conditions for correct exposure, image capture conditions for overexposure, and image capture conditions for underexposure. Further, in the first embodiment, the first process is a process related to exposure, and the system control unit 70 sets exposure on the basis of an image captured on multiple image capture conditions. According to this configuration, a wide range of luminance can be measured.

Further, in the first embodiment, the first process is a process related to exposure, and the system control unit 70 controls image capture at least in the first region on the three exposure conditions (the exposure condition for correct exposure, the exposure condition for overexposure, and the exposure condition for underexposure). According to this configuration, images having a wide range of gradations can be obtained using images having no blown-out highlights or crushed blacks.

Second Embodiment

In the first embodiment, the second metering regions 202 and third metering regions 203 are formed discretely in each block 200A. On the other hand, in a second embodiment, first metering regions, second metering regions, and third metering regions are formed in lines extending in the row direction.

Figure 14:
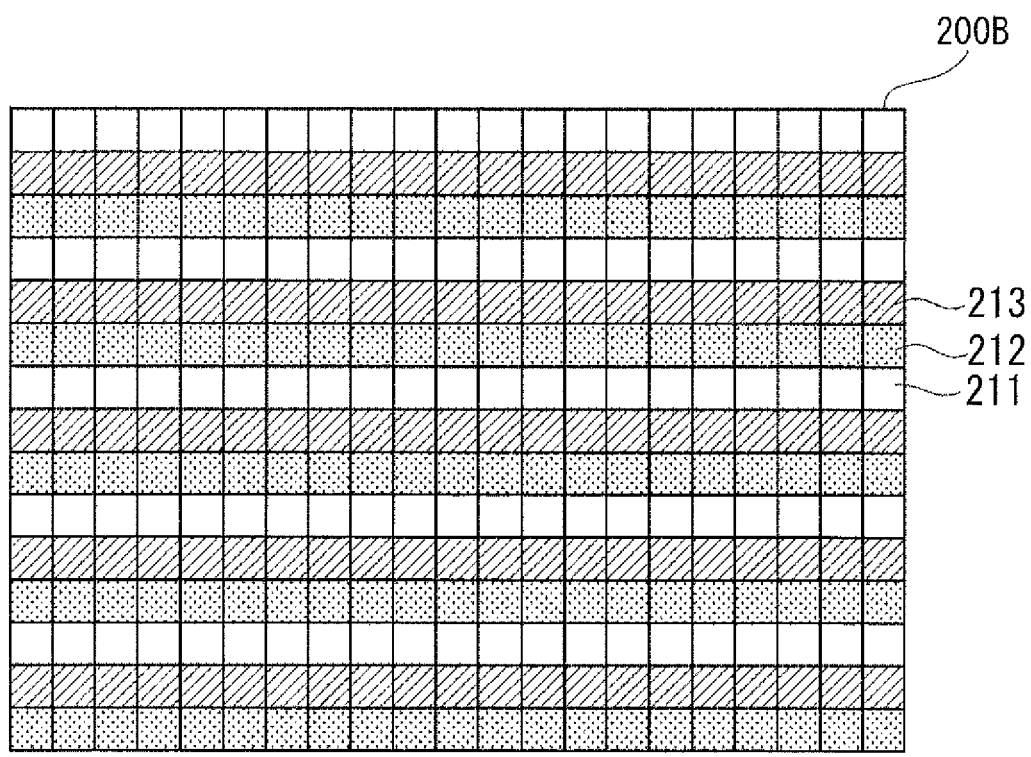
FIG. 14 is a diagram showing multiple regions in a block of a second embodiment.

FIG. 14 is a diagram showing multiple regions, 211, 212, and 213, in a block 200B of the second embodiment. The block 200B shown in FIG. 14 corresponds to the block 200A shown in the partial enlarged view in FIG. 5. That is, the block 200B is one block disposed in a pixel region 113A. As shown in FIG. 14, the first photometric regions 201 are the (3m−2)th row regions where m is a positive integer. The second metering regions 212 are the (3m−1)th row regions where m is a positive integer. The third metering regions 213 are the 3m-th row regions where m is a positive integer. While, in the example shown in FIG. 14, the first metering regions 211, second metering regions 212 and third metering regions 213 have the same area, the first metering regions 211, second metering regions 212, and third metering regions 213 may have different areas.

Image capture conditions on which correct exposure is obtained are set for the first metering regions 211; image capture conditions on which overexposure is obtained are set for the second metering regions 212; and image capture conditions on which underexposure is obtained are set for the third metering regions 213. As seen above, the image sensor 100 of the second embodiment also can capture images in the respective blocks 200B on different image capture conditions and output pixel signals, as well as can capture images in the respective metering regions of each block 200B on different image capture conditions and output pixel signals.

Figure 15:
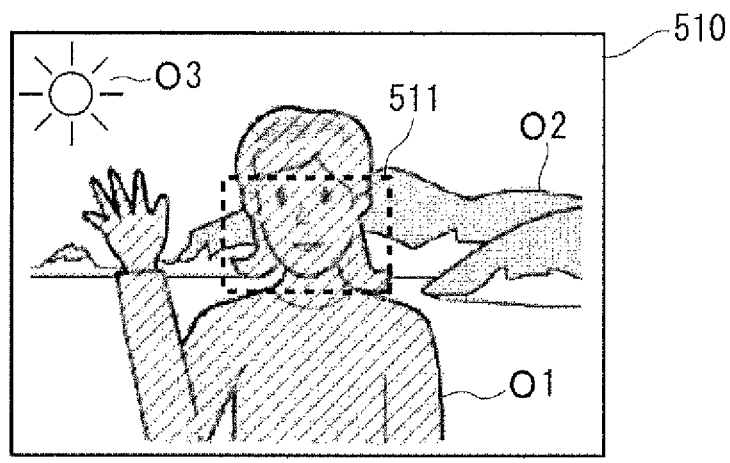
FIG. 15 is a drawing showing an example display of a backlight scene of the second embodiment and a contrast AF region.

FIG. 15 is a drawing showing an example display of a backlight scene 510 of the second embodiment and a contrast AF region 511. As with the backlight scene 500 shown in FIG. 10, the backlight scene 510 shown in FIG. 15 is a scene displayed on a display panel 51 of a display unit 50. The backlight scene 510 also includes a person O1 serving as a main subject, a background O2 including a mountain, a sea, and a cloud, and the sun O3. Since the sun O3 lies behind the person O1, the person O1 is backlighted and suffering crushed blacks. On the other hand, the sun O3, and the sea surface, cloud, and the like receiving direct light from the sun O3 are suffering blown-out highlights. The contrast AF region 511 is an image (subject) region in which the focal position is detected by contrast AF. In the example shown in FIG. 15, the contrast AF region 511 is a region corresponding to the face of the person O1 and its vicinity.

In order for the image processing unit 30 to calculate the evaluation value of the contrast of a subject image, a high-pass filter extracts the high-frequency components of the subject image. Preferably, an image of the subject is captured on image capture conditions which are the same in the detection direction of the high-pass filter. For example, if the high-pass filter detects the high-frequency components horizontally, it is preferred to set the same image capture conditions in the row direction of the image sensor 100. Since the high-pass filter detects the high-frequency components horizontally, the first metering regions 211, second metering regions 212, and third metering regions 213 are formed in the block 200B as multiple linear regions extending in the row direction, as shown in FIG. 14.

Further, the image processing unit 30 detects the face of the person O1 using a known face detection function and defines the face and its vicinity as the contrast AF region 511. The high-pass filter detects the high-frequency components horizontally in the contrast AF region 511.

Figure 16:
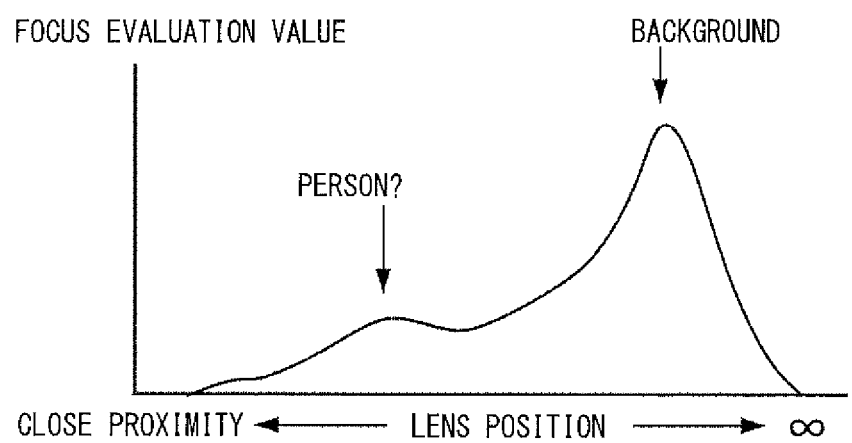
FIG. 16 is a graph showing the relationship between the focus evaluation value of a correctly exposed image in the backlight scene and the lens position.

FIG. 16 is a graph showing the relationship between the focus evaluation value of a correctly exposed image of the backlight scene 510 and the lens position. If the system control unit 70 sets correct exposure as an accumulation condition for AF in step S7 in FIG. 8, the relationship between the evaluation value (focus evaluation value) of the contrast of the subject image and the lens position of the imaging optical system 11 becomes a relationship as shown in FIG. 16. If the contrast AF region 511 contains the person and background O2 as shown in FIG. 15, almost no evaluation value of the person O1 darkened by backlight is detected, and only the evaluation value of the background O2 is detected.

Figure 17:
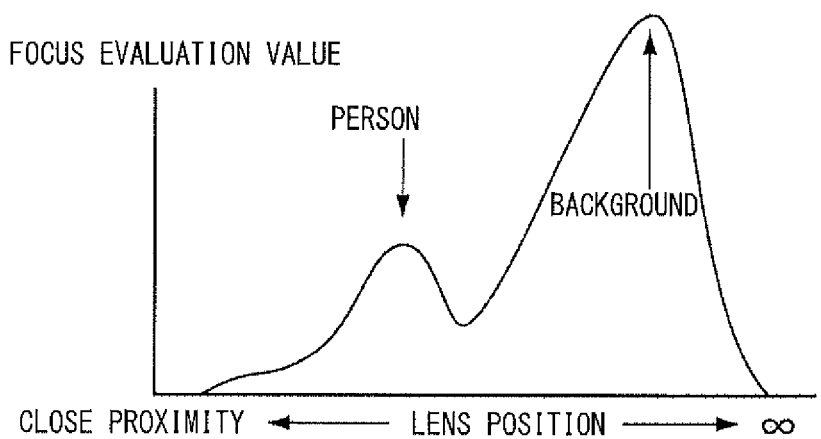
FIG. 17 is a graph showing the relationship between the focus evaluation value of an overexposed image in the backlight scene and the lens position.

FIG. 17 is a graph showing the relationship between the focus evaluation value of an overexposed image of the backlight scene 510 and the lens position. If the system control unit 70 sets overexposure as an accumulation condition for AF in step S7 in FIG. 8, the relationship between the evaluation value (focus evaluation value) of the contrast of the subject image and the lens position of the imaging optical system 11 becomes a relationship as shown in FIG. 17. This evaluation value is based on image data obtained by capturing an image in the second metering regions 202 by overexposure, and the peak of the evaluation value of the person O1 darkened by backlight appears near close proximity. Thus, even when the person O1 is darkened by backlight, the system control unit 70 can detect the lens position (focal position) corresponding to the person O1 in AF (step S8). When a new peak appears in the evaluation value by changing the accumulation condition for AF, as described above, the system control unit 70 may handle the newly appearing peak as a main subject and may control AF so that the focusing lens 11c is focused on this main subject. Further, the system control unit 70 may calculate AE for capturing a real image, on the basis of the image capture condition for AF on which the main subject has been detected.

If the main subject image is suffering blown-out highlights and thus the evaluation value of the contrast of the main subject image does not appear, the system control unit 70 sets overexposure as exposure for AF. Thus, it is possible to accurately detect the focal position of even the main subject suffering blown-out highlights.

As seen above, in the second embodiment, the second process is a process related to focusing, and the control unit 70 determines a main subject on the basis of an image captured on multiple image capture conditions. According to this configuration, it is possible to accurately detect the focal position of even a main subject which is darkened by backlight or a main subject which is suffering blown-out highlights by direct light.

Third Embodiment

While the system control unit 70 performs contrast AF in the second embodiment, a system control unit 70 performs phase difference AF in a third embodiment.

Figure 18:
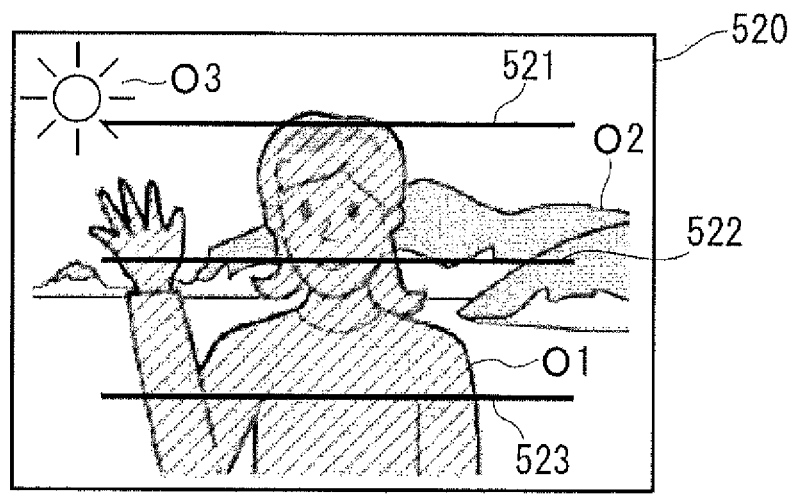
FIG. 18 is a drawing showing an example display of a backlight scene of a third embodiment and a phase difference AF region.

FIG. 18 is a drawing showing an example display of a backlight scene 520 of the third embodiment and phase difference AF regions 521, 522, and 523. As with the backlight scene 500 shown in FIG. 10, the backlight scene 520 shown in FIG. 18 is displayed on a display panel 51 of a display unit 50. The backlight scene 520 also includes a person O1 serving as a main subject, a background O2 including a mountain, a sea, and a cloud, and the sun O3. Since the sun O3 lies behind the person O1, the person O1 is backlighted and is suffering crushed blacks. On the other hand, the sun O3, and the sea surface, cloud, and the like receiving direct light from the sun O3 are suffering blown-out highlights. The phase difference AF region 521, 522, and 523 are regions in which the focal position is detected by phase difference AF. In the example shown in FIG. 18, the three linear phase difference AF regions 521, 522, and 523 are disposed in the horizontal direction of the backlight scene 520. In a pixel region 113A of an image sensor 100, a first metering region, a second metering region, and a third metering region are formed in positions corresponding to the phase difference AF region 521, 522, and 523 in the backlight scene 520. Phase difference detection pixels are disposed in the first metering region, second metering region, and third metering region (see FIG. 19).

Figure 19:
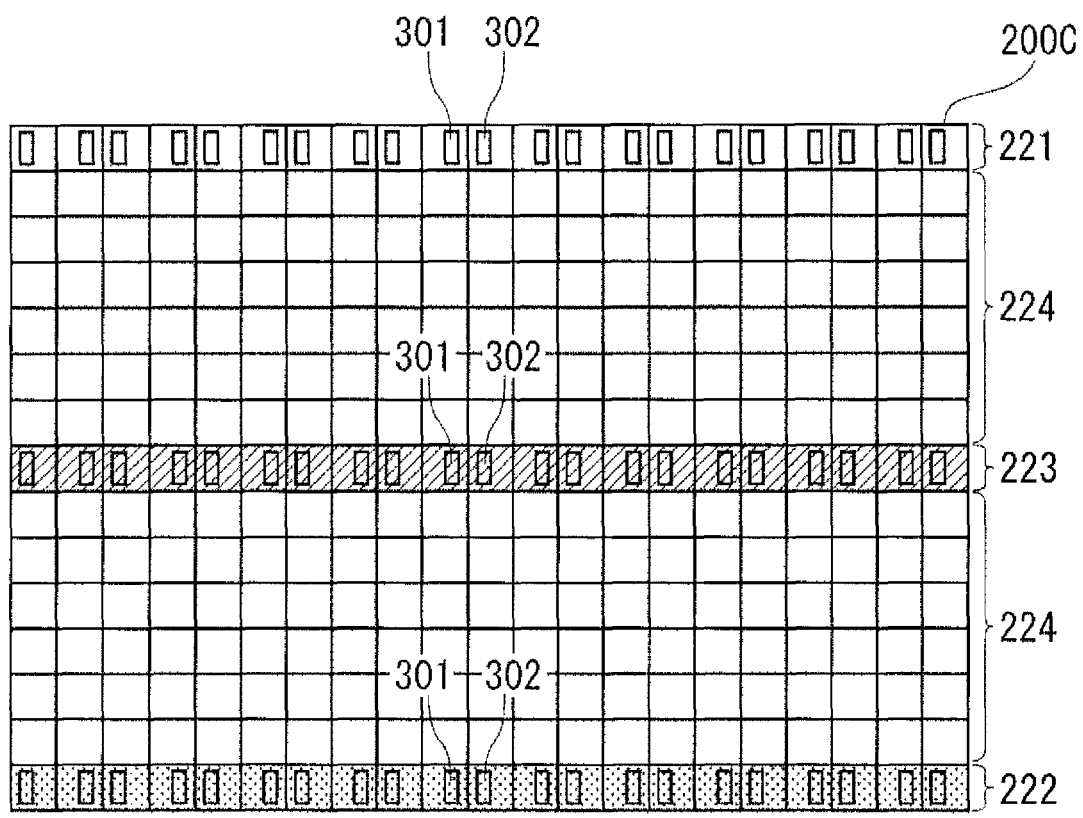
FIG. 19 is a diagram showing multiple regions in a block of the third embodiment.

FIG. 19 is a diagram showing multiple regions, 221, 222, and 223, in a block 200C of the third embodiment. The block 200C shown in FIG. 19 is one block included in a phase difference AF region (not shown) in the pixel region 113A corresponding to one phase difference AF region (e.g., the phase difference AF region 521) in the backlight scene 520. That is, by disposing the block 200C shown in FIG. 19 in the row direction, one phase difference AF region is formed in the pixel region 113A. A region in the backlight scene 520 corresponding to one phase difference AF region in the pixel region 113A is one phase difference AF region (e.g., the phase difference AF region 521).

As shown in FIG. 19, the block 200G consists of multiple pixels. The first metering region 221, which consists of pixels in the uppermost row, contains phase difference detection pixels 301 and 302. The second metering region 222, which consists of pixels in the lowermost row, also contains phase difference detection pixels 301 and 302. The third metering region 223, which consists of pixels in the middle row, also contains phase difference detection pixels 301 and 302. Regions 224 other than the first metering region 221, second metering region 222, and third metering region 223 in the block 200C contain normal pixels, which capture images.

Image capture conditions on which correct exposure is obtained are set for the first metering regions 221; image capture conditions on which overexposure is obtained are set for the second metering region 222; and image capture conditions on which underexposure is obtained are set for the third metering region 223. As seen above, the image sensor 100 of the second embodiment also can capture images in the respective blocks 200B on different image capture conditions and output pixel signals, as well as can capture images in the respective metering regions in each block 200B on different image capture conditions and output pixel signals.

In order to maintain the focus detection accuracy in phase difference detection by the phase difference detection pixels 301 and 302, it is preferred to capture a subject image on the same image capture conditions in the respective pixel groups disposed in the pupil division direction (first metering region 221, second metering region 222, third metering region 223). For example, in the case of horizontally pupil-divided phase difference detection pixels 301 and 302, it is preferred to set the same image capture conditions in the row direction of the image sensor 100. For this reason, as shown in FIG. 19, the first metering region 221, second metering region 222, and third metering region 223 are formed in 2000c as linear regions extending in the row direction, and the phase difference detection pixels 301 and 302 are disposed in each of the first metering region 221, second metering region 222, and third metering region 223.

The sensitivity of the phase difference detection pixels 301 and 302 are limited in order to obtain a subject image based on a light beam passing through different exit pupil regions in the image formation optical system. For this reason, the phase difference detection pixels 301 and 302 have lower sensitivity than normal pixels. Accordingly, the system control unit 70 sets, for the first metering region 221, higher correct exposure than the correct exposure of normal pixels. The system control unit 70 also sets, for the second metering region 222, higher overexposure than the overexposure of normal pixels. The system control unit 70 also sets, for the third metering region 223, higher underexposure than the underexposure of normal pixels.

This configuration prevents the luminance level of the person O1 suffering crushed blacks in the backlight scene 520 from being further reduced by the low sensitivity of the phase difference detection pixels 301 and 302. Further, the system control unit 70 acquires luminance distribution data based on image data captured in the phase difference detection pixels 301 and 302 of the second metering region 222 and luminance distribution data based on image data captured in the phase difference detection pixels 301 and 302 of the third metering region 223. Thus, it is possible to prevent crushed blacks or blown-out highlights from occurring in luminance distribution data of a low-luminance subject (person O1) or luminance distribution data of a high-luminance subject (sun O3), as well as to measure the distance of a subject having a wide luminance range.

As seen above, in the third embodiment, the control unit 70 determines a main subject (e.g., the person O1) on the basis of the difference (phase difference) between an image captured on a first image capture condition and an image captured on a second image capture condition.

According to this configuration, it is possible to determine a main subject having a wide luminance range.

Fourth Embodiment

While the image capture conditions do not vary among subjects in the first embodiment, the image capture conditions vary among subjects in a fourth embodiment.

Figure 20:
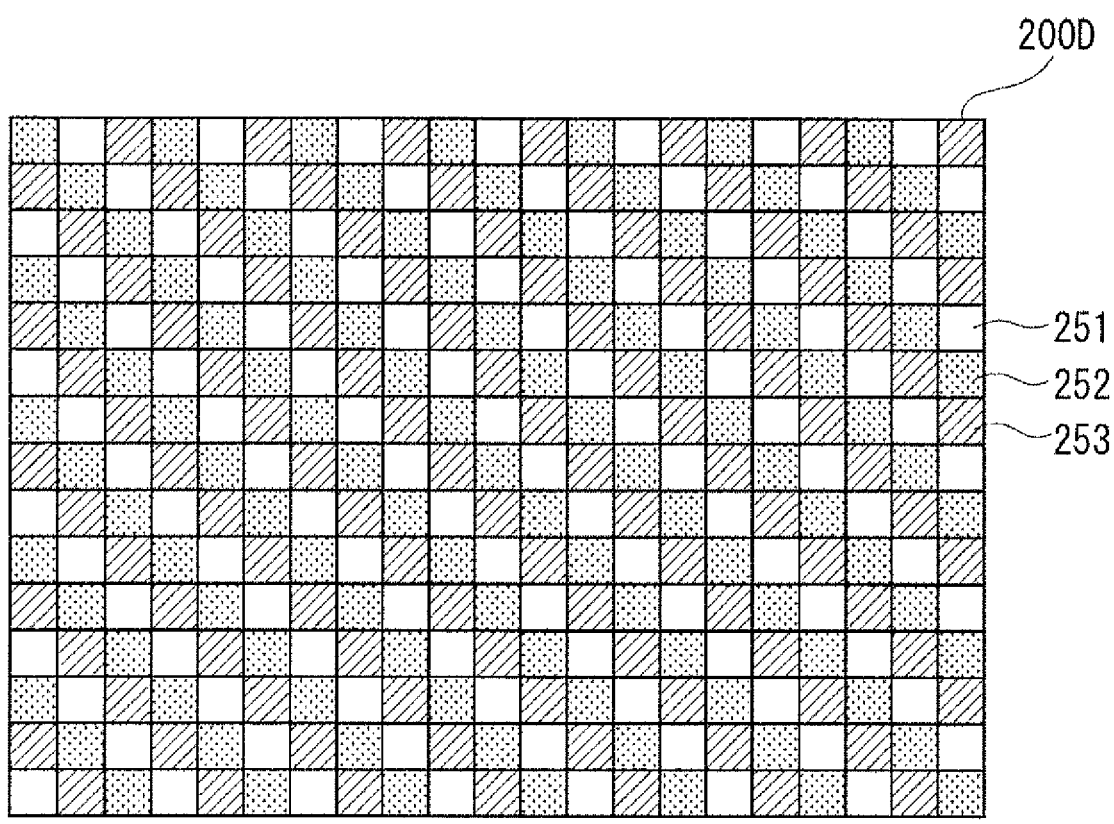
FIG. 20 is a diagram showing multiple regions in a block of a fourth embodiment.

FIG. 20 is a diagram showing multiple regions, 251, 252, and 253, in a block 200D of the fourth embodiment. The block 200D shown in FIG. 20 corresponds to the block 200A shown in the partial enlarged view in FIG. 5. That is, the block 200E is one block disposed in a pixel region 113A. As shown in FIG. 20, the first metering regions 251, second metering regions 252, and third metering regions 253 are disposed in a checkered pattern in the block 200D (that is, the first metering regions 251, second metering regions 252, and third metering regions 253 are disposed discretely and uniformly in the block 200D). While, in the example shown in FIG. 20, the first metering regions 251, second metering regions 252, and third metering regions 253 have the same area, the first metering regions 251, second metering regions 252, and third metering regions 253 may have different areas.

Image capture conditions on which correct exposure is obtained are set for the first metering regions 251; image capture conditions on which overexposure is obtained are set for the second metering regions 252; and image capture conditions on which underexposure is obtained are set for the third metering regions 253. As seen above, the image sensor 100 of the fourth embodiment also can capture images in the respective blocks 200D on different image capture conditions and output pixel signals, as well as can capture images in the respective metering regions of each block 200D on different image capture conditions and output pixel signals.

Figure 21:
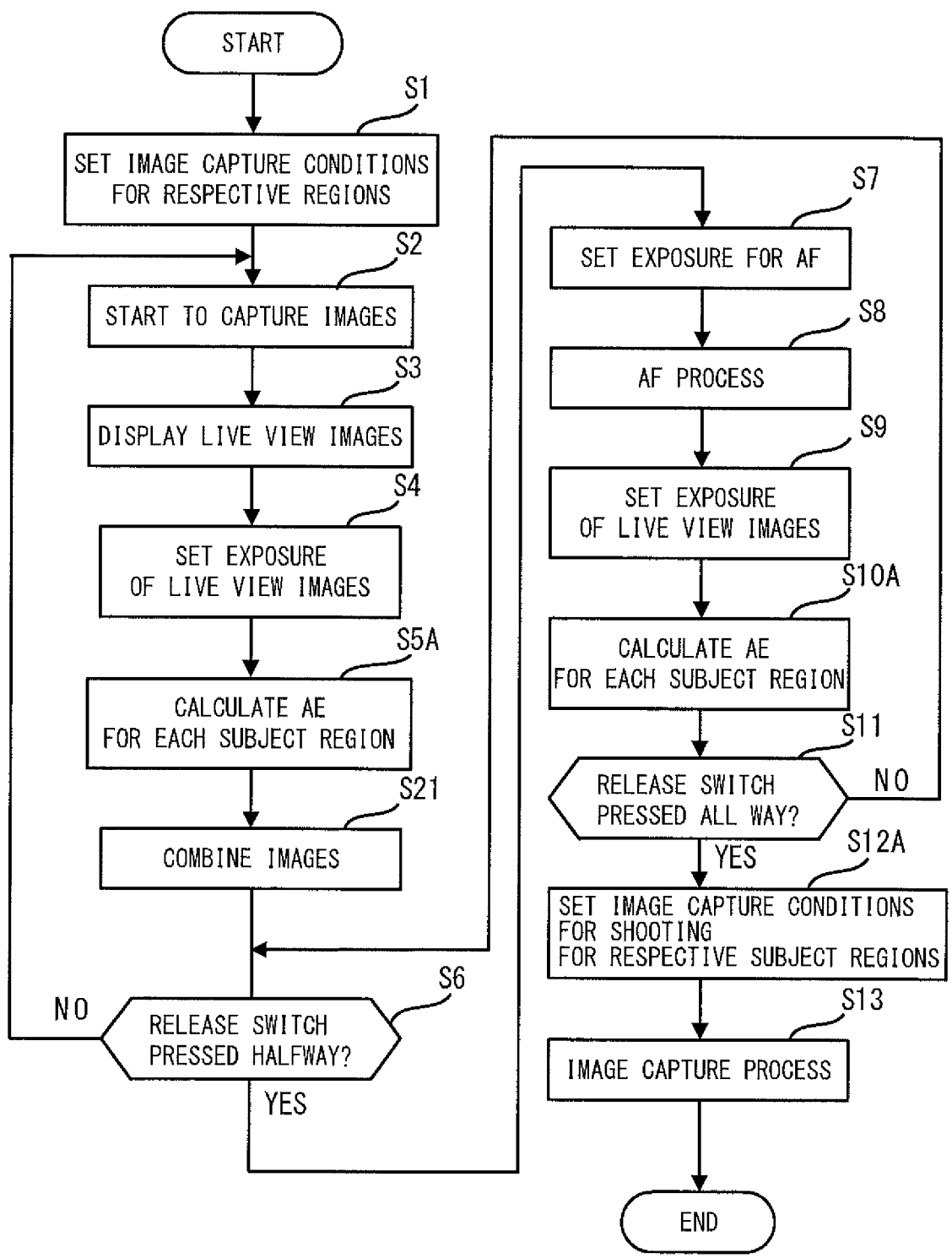
FIG. 21 is a flowchart showing an image capture operation performed by a system control unit of the fourth embodiment.

FIG. 21 is a flowchart showing an image capture operation performed by a system control unit of the fourth embodiment. Steps S1 to 94, S6 to S9, S11, and S13 in FIG. 21 are similar to those shown in FIG. 8 and therefore will not be described repeatedly. In the process shown in FIG. 21, a system control unit 70 acquires position signals indicating the positions of subjects detected by an image processing unit 30. The system control unit 70 then recognizes subject regions (blocks corresponding to the subjects) on the basis of the position signals from the image processing unit 30 (e.g., signals specifying the positions of the subjects in units of blocks) and calculates AE for each subject region (step S5A). The system control unit 70 then sets, as the exposure of live view images, image capture conditions which vary among the subject regions and vary among the metering regions 251, 252, and 253 (step S4).

Figure 22:
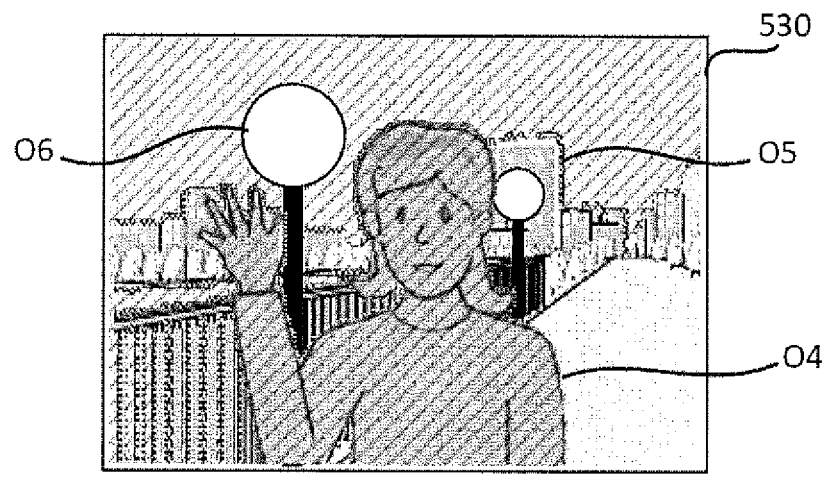
FIG. 22 is a drawing showing an example display of a backlight scene of the fourth embodiment.
Figure 23:
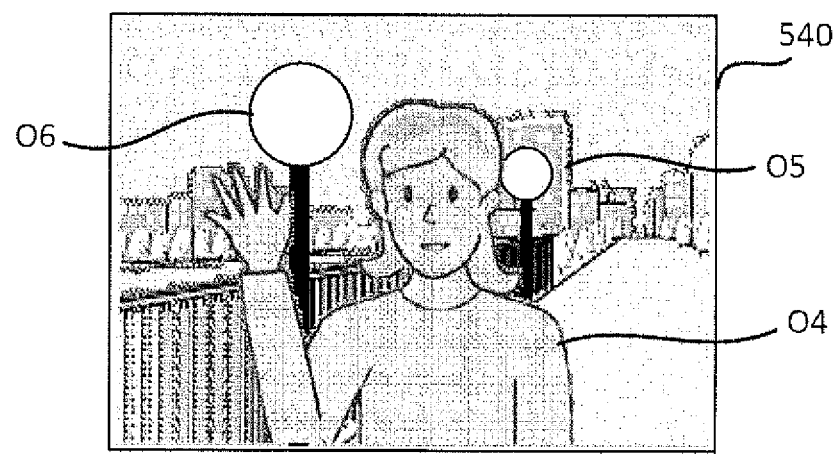
FIG. 23 is a drawing showing an example display of a backlight scene of the fourth embodiment, which is a combined image.

The system control unit 70 then combines pieces of image data corresponding to the respective subject regions (step S21). FIG. 22 is a drawing showing an example display of a backlight scene 530 of the fourth embodiment. The backlight scene 530 shown in FIG. 22 includes a backlighted person O4, a background O5, and a street lamp O6. The backlight scene 530 shown in FIG. 22 is a live view image before the system control unit 70 combines images in step S21. FIG. 23 is a drawing showing an example display of a backlight scene 540 of the fourth embodiment, which is a combined image. The backlight scene 540 shown in FIG. 23 includes a backlighted person O4, a background O5, and a street lamp O6. The backlight scene 540 shown in FIG. 23 is a combined image which is a combination of images of the subject regions made by the system control unit 70 in step S21. The backlight scene 540 differs from the backlight scene 530 in FIG. 22 in that it is an image which has been prevented from suffering crushed blacks.

High-dynamic-range (HDR) imaging is widely known as a typical image combining technology for recording and displaying an image with a wide dynamic range. In HDR imaging, an image having less blown-out highlights or crushed blacks is generated by capturing multiple images while changing image capture conditions (e.g., exposure) and then combining the images. However, in traditional HDR, two images, for example, are captured on different image capture conditions for different image capture times and therefore a subject may move or the user (photographer) may move the digital camera 1. In this case, the two images are no longer images of the same subject and therefore are difficult to combine. In the fourth embodiment, on the other hand, multiple images can be captured on different image capture conditions at the same time of day (or approximately at the same time of day) (see FIG. 9). This configuration of the fourth embodiment can solve the problem with the traditional HDR imaging. In step S21, the system control unit 70 combines images of the subject regions and thus can display live view images having a wide dynamic range.

Referring back to FIG. 21, the system control unit 70 performs step S9 and then recognizes the subject regions (blocks corresponding to the subjects) on the basis of the position signals from the image processing unit 30 and calculates AE for each subject region (step S10A). The system control unit 70 sets, as the exposure of live view images, image capture conditions which vary among the subject regions and vary among the metering regions 251, 252, and 253 (step S9). Step S10A is similar to step S5A and therefore will not be described. In response to a release switch being pressed all the way (YES in step S11), the system control unit 70 sets different image capture conditions for shooting for the respective subject regions (step S12A). The system control unit 70 then performs an image capture process (step S13). An image (still image) captured in the image capture process is an image which has been prevented from suffering crushed blacks, as shown in FIG. 23.

As seen above, in the fourth embodiment, the system control unit 70 controls the image sensor 100 so that the timings when images are captured on multiple image capture conditions (charge accumulation timings) partially overlap each other. According to this configuration, the control unit 70 can easily combine images and thus can display an image having a wide dynamic range.

Fifth Embodiment

A fifth embodiment provides a configuration in which the camera body 2 of the digital camera 1 of the first embodiment is divided into an image capture device 1A and an electronic apparatus 1B.

Figure 24:
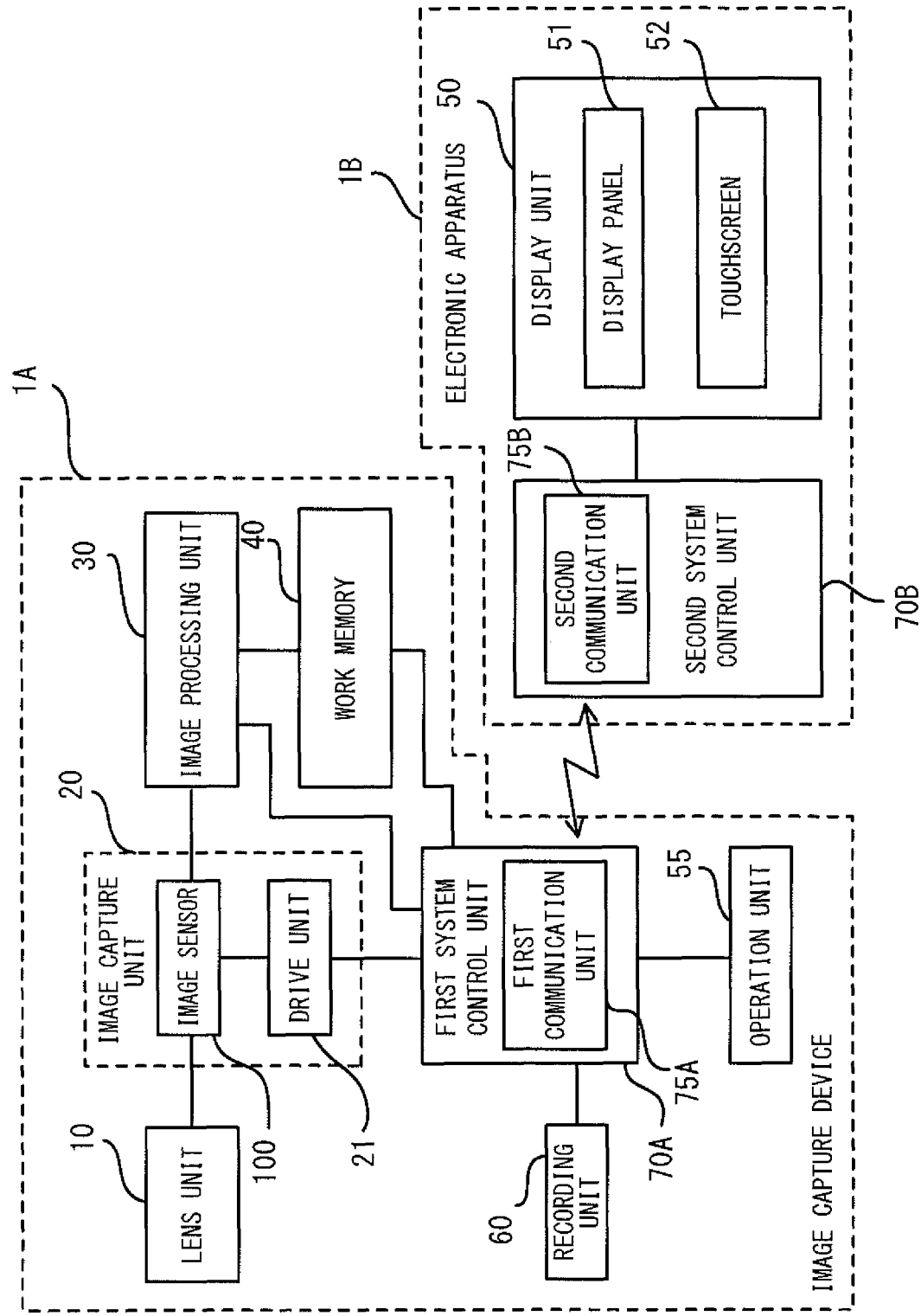
FIG. 24 is a block diagram showing the configuration of an image capture device and an electronic apparatus according to a fifth embodiment.

FIG. 24 is a block diagram showing the configuration of the image capture device 1A and electronic apparatus 1B according to the fifth embodiment. In the configuration shown in FIG. 24, the image capture device 1A captures images of subjects. The imaging device 1A includes a lens unit 10, an image capture unit 20, an image processing unit 30, a work memory 40, an operation unit 55, a recording unit 60, and a first system control unit 70A. The lens unit 10, image capture unit 20, image processing unit 30, work memory 40, operation unit 55, and recording unit 60 in the image capture device 1A are similar to those shown in FIG. 7. For this reason, the same elements are given the same reference signs and will not be described repeatedly.

The electronic apparatus 1B displays images (still images, moving images, live view images). The electronic apparatus 1B includes a display unit 50 and a second system control unit (control unit) 70B. The elements of the display unit 50 of the electronic apparatus 1B are similar to those shown in FIG. 7. For this reason, the same elements are given the same reference signs and will not be described repeatedly.

The first system control unit 70A includes a first communication unit 75A. The second system control unit 70B includes a second communication unit 75B. The first communication unit 75A and second communication unit 75B transmit and receive signals to and from each other by wire or wirelessly. In this configuration, the first system control unit 70A transmits image data (image data processed by the image processing unit 30, image data stored in the recording unit 60) to the second communication unit 75B through the first communication unit 75A. The second system control unit 70B displays the image data received by the second communication unit 75B on the display unit 50. The system control unit 70B also displays a preset menu image on a second display unit 53.

The system control unit 70B also changes image capture conditions (including accumulation conditions) in response to a touch on a touchscreen 52 by the user, or automatically. The system control unit 70B also selects a display region in an image display region 510 in response to a touch on the touchscreen 52 by the user, or automatically. The first system control unit 70A controls image capture in response to an operation of the operation unit 55 (an operation unit disposed on the electronic apparatus 1B and configured to request the start of capture of still images or moving images) by the user.

The elements shown in FIG. 7 (division unit 71, drive control unit 72, control unit 73, and blinking detection unit 74) may be disposed in any of the first system control unit 70A and system control unit 70B. All the elements shown in FIG. 7 may be disposed in one of the first system control unit 70A and second system control unit 70B. Some of the elements shown in FIG. 7 may be disposed in the first system control unit 70A, and the other elements may be disposed in the system control unit 70B.

Examples of the image capture device 1A includes digital cameras, smartphones, mobile phones, and personal computers which each have image capture and communication functions. Examples of the electronic apparatus 1B includes smartphones, mobile phones, and portable personal computers which each have a communication function.

The first system control unit 70A shown in FIG. 24 is implemented when a body-side CPU performs processing on the basis of a control program. The second system control unit 70B shown in FIG. 24 is also implemented when the body-side CPU performs processing on the basis of the control program.

As seen above, the fifth embodiment produces the effects described in the first embodiment, as well as allows the user to check multiple live view images being captured by the image capture device 1A using a mobile terminal, such as a smartphone, before shooting.

In the configuration shown in FIG. 24, the image processing unit 30 and first system control unit 70A may be integral with each other. In this case, the functions of the image processing unit 30 and first system control unit 70 are implemented when a system control unit including one or more CPUs performs processing on the basis of a control program.

While the present invention has been described using the embodiments, the technical scope of the invention is not limited to the scope described in the embodiments. Various changes or modifications can be made to the embodiments without departing from the spirit and scope of the invention. Further, one or more of the elements described in the embodiments may be omitted. Any forms resulting from such changes, modifications, or omission fall within the technical scope of the invention. Elements of the embodiments or modifications thereof may be combined as appropriate and used.

While the color filters 102 form a Bayer array in the embodiments, they may form other types of arrays. Each unit group 131 only has to include at least one pixel. Each block also only has to include at least one pixel. Accordingly, it is also possible to capture images on image capture conditions which vary among the pixels.

In the embodiments, some or all elements of the drive unit 21 may be included in the image capture chip 113 or signal processing chip 111. Some elements of the image processing unit 30 may be included in the image capture chip 113 or signal processing chip 111. Some elements of the system control unit 70 may be included in the image capture chip 113 or signal processing chip 111.

While, in the embodiments, the image capture conditions that the system control unit 70 can set are the gain, charge accumulation time (exposure time, shutter speed), and frame rate, the image capture conditions may be other control parameters. While only the case in which image capture conditions are set automatically has been described, image capture conditions may be set in response to an operation of the operation unit 55 or the like by the user.

While the case in which the sizes of the block regions are previously set has been described in the embodiments, the user may set the sizes of the block regions.

The digital cameras 1 of the above embodiments may be any apparatus, including digital cameras, smartphones, mobile phones, and personal computers, as long as the apparatus has an image capture function.

DESCRIPTION OF REFERENCE SIGNS

1 . . . digital camera (electronic apparatus), 1A . . . image capture device (electronic apparatus), 1B . . . electronic apparatus, 11 . . . imaging optical system, 20 . . . image capture unit, 30 . . . image processing unit, 50 . . . display unit, 51 . . . display panel, 55 . . . operation unit, 70 . . . system control unit (control unit), 70A . . . first system control unit (control unit), 70B . . . second system control unit (control unit), 100 . . . image sensor

The invention claimed is:

1. An electronic apparatus comprising:
an image sensor including:
a plurality of first pixels, each of the first pixels including a first photoelectric converter that converts light to a charge, a first selector, and a first transferer that transfers the charge converted by the first photoelectric converter to the first selector,
a plurality of second pixels, each of the second pixels including a second photoelectric converter that converts light to a charge, a second selector, and a second transferer that transfers the charge converted by the second photoelectric converter to the second selector,
a first control line, which is connected to the first transferer included in each of the plurality of first pixels, and to which is outputted a first control signal used to control the first transferers, and
a second control line, which is connected to the second transferer included in each of the plurality of second pixels, and to which is outputted a second control signal used to control the second transferers;
a first output line directly connected to each of the first selectors of the plurality of first pixels and to which is outputted first signals from each of the plurality of first pixels;
a second output line directly connected to each of the second selectors of the plurality of second pixels and to which is outputted second signals from each of the plurality of second pixels; and
a controller that controls a process relating to image capture using at least one of the first signals and the second signals, wherein:
the plurality of the first photoelectric converters are arranged in a row direction and a column direction crossing the row direction in a first region where light enters,
the plurality of the second photoelectric converters are arranged in the row direction and the column direction in a second region where light enters, the second region being arranged at a row direction side of the first region such that a virtual line extending in the row direction intersects both the first region and the second region,
the number of the plurality of the first photoelectric converters arranged in the first region and the number of the plurality of the second photoelectric converters arranged in the second region are the same, and
a total number of photoelectric converters arranged in the first region and a total number of photoelectric converters arranged in the second region are the same.

2. The electronic apparatus of claim 1, wherein the controller controls the process relating to image capture based on values of the first and second signals.

3. The electronic apparatus of claim 1, wherein the controller controls image capture by setting an image capture condition of the image sensor using at least one of the first and second signals.

4. The electronic apparatus of claim 3, wherein the image capture condition of the image sensor is an exposure condition of the image sensor.

5. The electronic apparatus of claim 1, wherein:
the image sensor has a plurality of the first regions and a plurality of the second regions.

6. The electronic apparatus of claim 1, wherein the controller controls, using at least one of the first and second signals, a position of a focus lens that transmits light that will enter the image sensor.

7. The electronic apparatus of claim 6, wherein:
the image sensor has an image capture region comprising the first region and the second region.

8. The electronic apparatus of claim 6, wherein the controller detects contrast of at least one of the first and second signals and controls the position of the focus lens using the detected contrast.

9. The electronic apparatus of claim 6, wherein the controller sets an exposure condition of the image sensor using at least one of the first and second signals.

10. The electronic apparatus of claim 9, wherein the controller sets the exposure condition of the image sensor using, among the first and second signals, the signal having been used by the controller to set a condition for controlling the position of the focus lens.

11. The electronic apparatus of claim 1, wherein the process relating to image capture is at least one of auto focus, auto exposure, and white balance.

12. The electronic apparatus of claim 1, wherein the first control signal is outputted to the first control line at a timing different from a timing at which the second control signal is outputted to the second control line.

13. The electronic apparatus of claim 1, wherein:
the image sensor further includes:
a plurality of third pixels, each of the third pixels including a third photoelectric converter that converts light to a charge and a third transferer that transfers the charge converted by the third photoelectric converter, and
a third control line, which is connected to the third transferer included in each of the plurality of third pixels, and to which is outputted a third control signal used to control the third transferers;
the controller controls the process relating to image capture using at least one of the first signals outputted from the first pixels, the second signals outputted from the second pixels, and third signals outputted from the third pixels; and
the plurality of the third photoelectric converters are arranged in the row direction and the column direction in a third region where light enters, the third region being arranged at a column direction side of the first region.

14. The electronic apparatus of claim 1, wherein a transferer of each pixel in the first region is connected to the first control line and a transferer of each pixel in the second region is connected to the second control line.

15. The electronic apparatus of claim 1, wherein:
the first output line is connected to each of the first transferers to which the first control line is also connected, and
the second output line is connected to each of the second transferers to which the second control line is also connected.

* * * * *